United States Patent
Son et al.

(10) Patent No.: US 10,913,374 B2
(45) Date of Patent: Feb. 9, 2021

(54) CONTROL DEVICE FOR CONTROLLING HOME ENERGY MANAGEMENT SYSTEM AND GATEWAY

(71) Applicant: LG Electronics Inc., Seoul (KR)

(72) Inventors: Dongmin Son, Seoul (KR); Jiyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 220 days.

(21) Appl. No.: 15/669,447

(22) Filed: Aug. 4, 2017

(65) Prior Publication Data

US 2018/0037131 A1 Feb. 8, 2018

(30) Foreign Application Priority Data

Aug. 5, 2016 (KR) .................. 10-2016-0099828
Aug. 5, 2016 (KR) .................. 10-2016-0099829
Aug. 5, 2016 (KR) .................. 10-2016-0099833

(51) Int. Cl.
*B60L 11/18* (2006.01)
*H02J 3/38* (2006.01)
(Continued)

(52) U.S. Cl.
CPC .............. *B60L 55/00* (2019.02); *B60L 53/00* (2019.02); *B60L 53/305* (2019.02); *B60L 53/51* (2019.02);
(Continued)

(58) Field of Classification Search
CPC ...... B60L 11/1861; B60L 53/00; B60L 53/30; B60L 55/00; B60L 58/12; G06Q 10/04; G06Q 50/06; H02J 3/383; H02J 7/35; H02J 13/00026; H02J 7/0013; H02J 7/0014; H02J 7/0016; H02J 7/0018; H02J 7/0019; H02J 7/0024; H02J 7/0025; Y02B 10/14; Y02E 60/721; Y02T 10/7005; Y02T 10/7044;
(Continued)

(56) References Cited

U.S. PATENT DOCUMENTS

2010/0017045 A1* 1/2010 Nesler .................. B60L 53/305 700/296
2012/0277923 A1* 11/2012 Tsuchiya ................ B60L 53/53 700/291

(Continued)

FOREIGN PATENT DOCUMENTS

WO WO 2010/042550 A2 4/2010

*Primary Examiner* — Rexford N Barnie
*Assistant Examiner* — Elim Ortiz
(74) *Attorney, Agent, or Firm* — Birch, Stewart, Kolasch & Birch, LLP

(57) ABSTRACT

Provided is a control device for controlling a home energy management system (HEMS). The control device for controlling the HEMS includes a communication unit configured to receive energy management information comprising a photovoltaic (PV) power generation amount, a power consumption amount of a home appliance, a remaining power amount of a battery of an electric vehicle (EV), and a minimum charging amount of the EV from a gateway of the HEMS, and a control unit configured to control power of the battery provided in the EV so that the EV operates in one of a charging mode and a discharging mode on the basis of the energy management information.

11 Claims, 20 Drawing Sheets

(51) Int. Cl.
*B60L 55/00* (2019.01)
*G06Q 50/06* (2012.01)
*G06Q 10/04* (2012.01)
*B60L 58/12* (2019.01)
*B60L 53/00* (2019.01)
*B60L 53/51* (2019.01)
*B60L 53/30* (2019.01)

(52) U.S. Cl.
CPC .............. *B60L 58/12* (2019.02); *G06Q 10/04* (2013.01); *G06Q 50/06* (2013.01); *Y02T 10/7072* (2013.01); *Y02T 90/14* (2013.01); *Y02T 90/16* (2013.01); *Y04S 10/126* (2013.01)

(58) Field of Classification Search
CPC ............... Y02T 10/705; Y02T 10/7072; Y02T 10/7094; Y02T 90/121; Y02T 90/128; Y02T 90/14; Y02T 90/16; Y02T 90/163; Y04S 10/126; Y04S 10/60
See application file for complete search history.

(56) References Cited

U.S. PATENT DOCUMENTS

| | | | | |
|---|---|---|---|---|
| 2014/0091753 | A1* | 4/2014 | Yonezawa | H02J 7/0068 320/107 |
| 2014/0142774 | A1* | 5/2014 | Katayama | G06Q 50/06 700/291 |

* cited by examiner

FIG. 13B

TABLE

| LIGHTING DEVICE | SMART PLUG | HOME APPLIANCE | AVERAGE POWER CONSUMPTION |
|---|---|---|---|
| LIGHT1 | SP1 | PC | 300W |
| LIGHT2 | SP2 | Fridge | 100W |
| LIGHT2 | SP3 | Oven | 700W |
| LIGHT3 | SP4 | A/C | 1000W |
| LIGHT3 | SP5 | TV | 50W |
| LIGHT4 | SP6 | Washer | 200W |

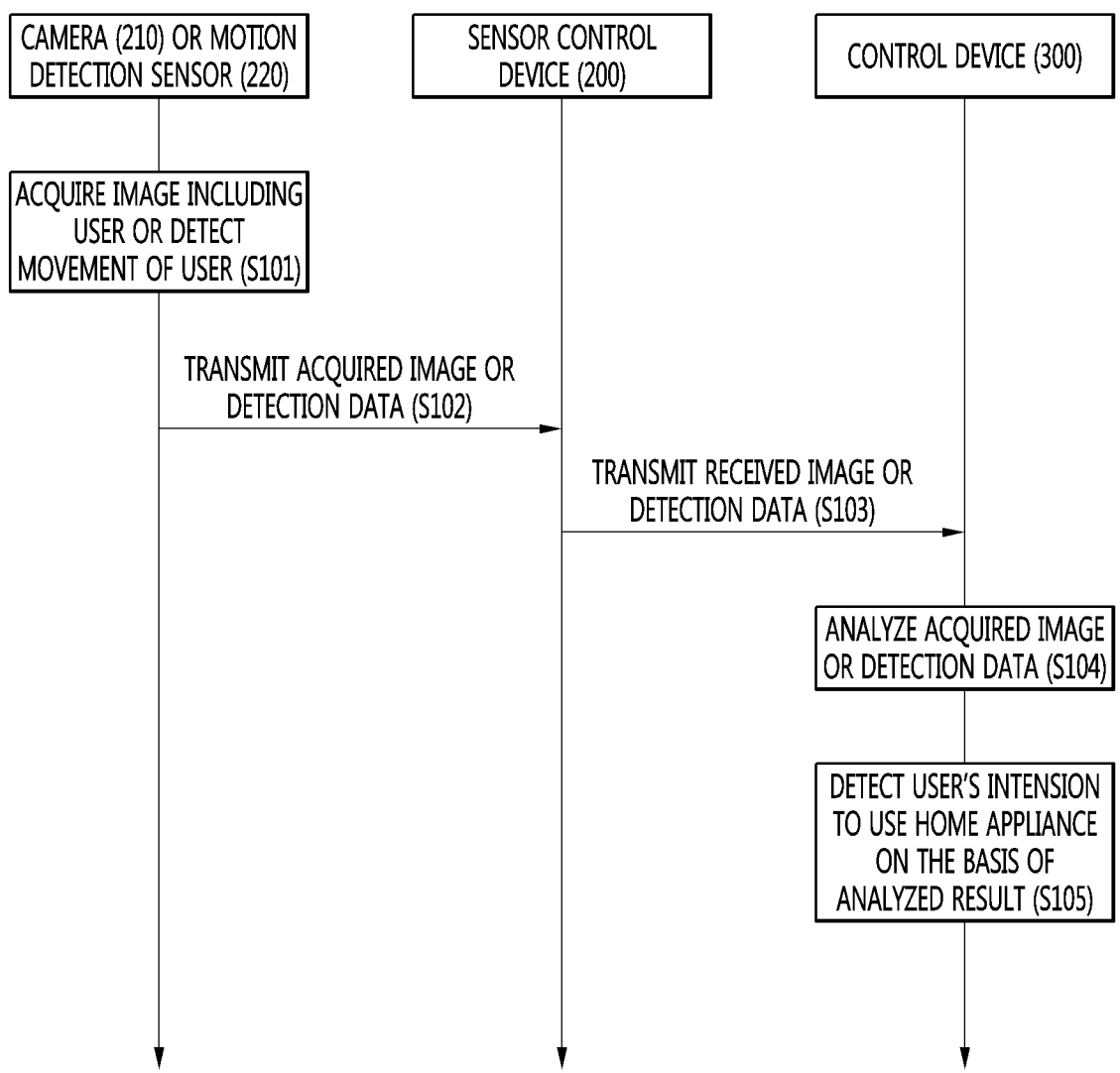

CONTROL DEVICE FOR CONTROLLING HOME ENERGY MANAGEMENT SYSTEM AND GATEWAY

CROSS-REFERENCE TO RELATED APPLICATIONS

This application claims priority under 35 U.S.C. 119 to Korean Patent Application No. 10-2016-0099828, filed on Aug. 5, 2016, Korean Patent Application No. 10-2016-0099829, filed on Aug. 5, 2016 and Korean Patent Application No. 10-2016-0099833, filed on Aug. 5, 2016 in the Korean Intellectual Property Office, the disclosures of all of which are incorporated herein by reference in their entireties.

BACKGROUND

The present disclosure relates to a control device for a home energy management system and a gateway.

As the demand for low-carbon society is increasing, the demand side, especially, the optimal use of energy in the household sector, and the measures for energy saving are attracting attention. In the future, the household sector is expected to promote the development of photovoltaic (PV) power generation, storage batteries, fuel cells, etc., and the introduction of power storage devices, and simultaneously, the spread of home appliances with communication functions is expected to advance.

These facilities and appliances are electrically connected to the power distribution system of the electric power company through smart meters. The communication function of the smart meter enables information exchange between the home appliance, the electric power company and the energy service company to optimize energy in the home and optimize energy supply and demand.

These societal demands are carried out by the home energy management system. The home energy management system (HEMS) refers to a system that networks and automatically controls the home appliances, which are energy consumption sources such as power, gas, and hot water in the home, by using IT technologies.

Such an existing HEMS includes an energy storage system (ESS) that uses and receives stored power when needed. That is, power management may be generally performed through the ESS.

However, there is a limitation that the power management is deteriorated in efficiency due to limited power capacity of the ESS according to the related art.

Also, in recent years, the power management in the home has been performed using electric power charged in a battery of an electric vehicle.

However, when the user is absent or present for a long time, there is a limitation that the battery power is not utilized even though the battery of the electric vehicle is sufficiently charged.

SUMMARY

Embodiments provide a control device, which is capable of efficiently performing power management in a home by using a battery of an electric vehicle having electric capacity greater than that of an ESS.

Embodiments also provide a control device, which is capable of allowing power of an electric vehicle to be flexibly charged and discharged according to situations rather than passively using the power.

Embodiments also provide a control device, which is capable of providing power provided from a PV module to flexibly charge or discharge a battery of an electric vehicle or providing power of the battery of the electric vehicle to home appliances.

Embodiments also provide a control device, which is capable of flexibly charging and discharging a battery of an electric vehicle on the basis of a minimum charging amount of electric vehicle.

Embodiments also provide a control device, which is capable of easily informing whether an electric vehicle is in a charging mode or a discharging mode to a terminal of a user.

In one embodiment, a control device for controlling a home energy management system receives energy management information comprising a photovoltaic (PV) power generation amount, a power consumption amount of a home appliance, a remaining power amount of a battery of an electric vehicle (EV), and a minimum charging amount of the EV to control power of the battery provided in the EV.

The control device of the home energy management system may allow the EV to operate in a charging mode when it is determined that charging of the battery of the EV is required on the basis of the energy management information.

The control device of the home energy management system may allow the EV to operate in a discharging mode when it is determined that discharging of the battery of the EV is required on the basis of the energy management information.

The control device of the home energy management system may receive the minimum charging amount of the EV from a terminal of a user.

The control device of the home energy management system may provide the current power mode of the EV to the terminal of the user.

A power management in a home may be efficiently performed by using the battery of the EV. Thus, electricity charges due to power consumption consumed in the home may be saved.

The battery of the EV may be charged through a PV module to save the electricity charges required for charging the battery.

When the power of the battery of the EV is sufficient, power may be supplied to the home appliance to save the electricity charges.

The minimum charging amount of the EV may be maintained to prevent the user from being interrupted in use of the EV.

The user may easily grasp the current power mode of the EV.

Embodiments provide a control device, which is capable of detecting a long-term absence situation or a long-term presence situation of a user to provide power charged in a battery of an EV, which is not used currently, to a home appliance.

Embodiments also provide a control device, which is capable of detecting a long-term absence situation or a long-term presence situation to allow a user to actively use power of a battery of an EV.

Embodiments also provide a control device, which is capable of grasping a long-term absence situation or a long-term presence situation through various sensors provided in a home.

Embodiments also provide a control device, which is capable of informing how much battery power of an EV is provided to a home appliance and a power saving cost due to the power consumption of the home appliance.

Embodiments also provide a control device, which is capable of easily informing whether an electric vehicle is in a charging mode or a discharging mode to a terminal of a user.

In one embodiment, a control device for controlling a home energy management system receives one of absence information or presence information of a user to switch a power mode of an EV into a discharging mode when a long-term absence situation or a long-term presence situation is detected.

The control device for controlling the home energy management system may transmit a message to a terminal of a user so that power of a battery of the EV is discharged when the long-term absence situation or the long-term presence situation is detected.

The control device for controlling the home energy management system may grasp the long-term absence situation or the long-term presence situation by using a time point, at which the user is present in the home, acquired through sensors.

The control device for controlling the home energy management system may provide a power cost saved as the EV operates in the discharging mode to the terminal of the user.

The control device for controlling the home energy management system may provide the current power mode of the EV to the terminal of the user.

The details of one or more embodiments are set forth in the accompanying drawings and the description below. Other features will be apparent from the description and drawings, and from the claims.

BRIEF DESCRIPTION OF THE DRAWINGS

FIGS. 13*a* and 13*b* are views illustrating an example of mapping data stored in the control device according to mapping results between lighting devices, smart plugs, and home appliances in the home.

FIGS. 14*a* to 14*b* are ladder diagrams illustrating an example of a method for detecting an intention to use the home appliance through the control device according to an embodiment, respectively.

DETAILED DESCRIPTION OF THE EMBODIMENTS

Hereinafter, embodiments disclosed in this specification are described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves.

Hereinafter, exemplary embodiments of the present disclosure will be described in detail with reference to the accompanying drawings.

Figure 1:
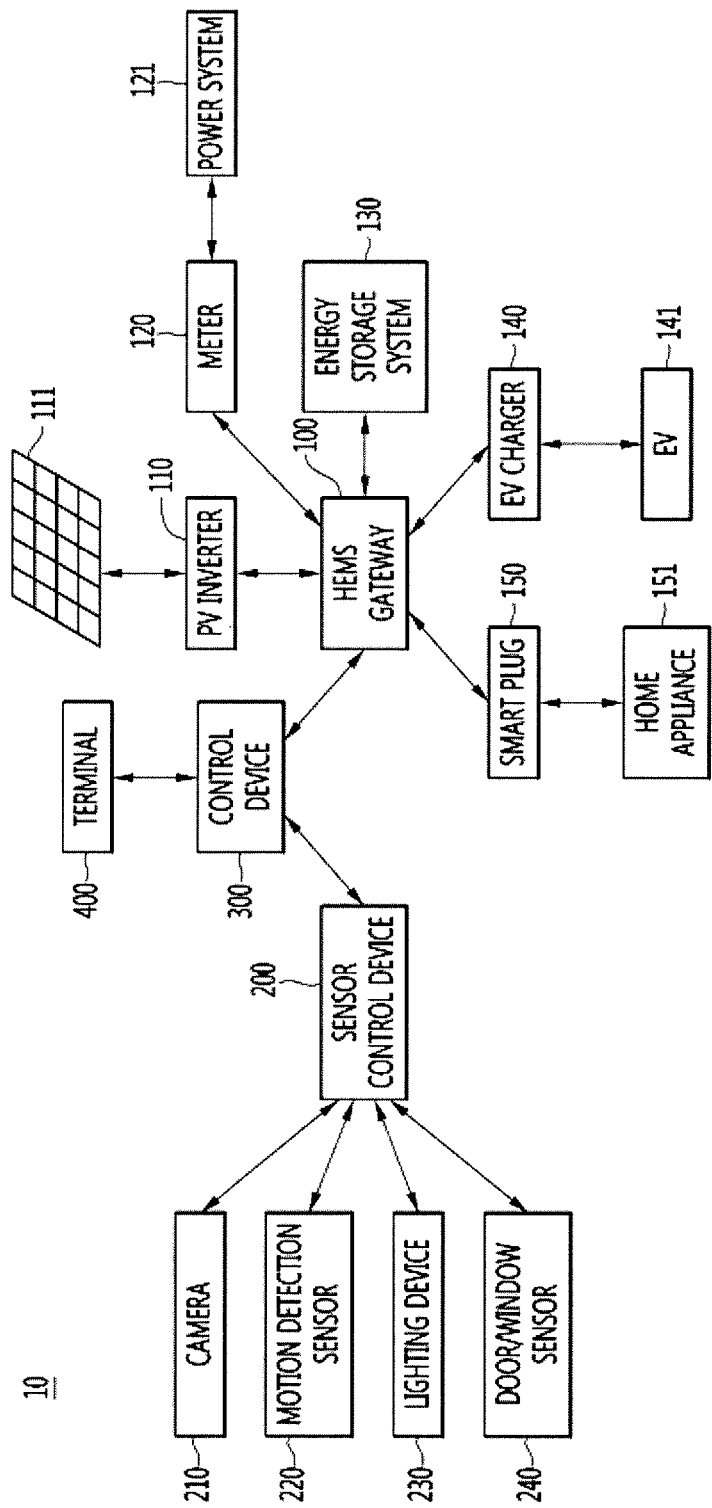
FIG. 1 is a schematic block diagram of a home energy management system (HEMS) according to an embodiment.

FIG. 1 is a schematic block diagram of a home energy management system (HEMS) according to an embodiment.

Referring to FIG. 1, a home energy management system (HEMS) 10 may be mainly implemented in the home and manage energy (power) supply, consumption, storage, and the like in the home. The HEMS 10 may include a HEMS gateway 100, a sensor control device 200, and a control device 300.

The HEMS gateway 100 may receive sensing information acquired from the sensor control device 200 by the sensor control device 200. The HEMS gateway 100 may transmit the received sensing information to the control device 300. The HEMS gateway 100 may exchange information with the sensor control device 200 through a short-range wireless communication module. The short-range wireless communication module may be one of Bluetooth™, Wi-Fi, and ZigBee, but this is merely an example.

The HEMS gateway 100 may receive information on power from power management-related devices that are installed in the home. The HEMS gateway 100 may transmit information on the received power to the control device 300. The HEMS gateway 100 and the control device 300 may be connected to the each other through the internet, but this is merely an example.

The HEMS gateway 100 may be connected to devices associated with power supply, power consumption, and power storage, which are installed or provided in the home to control operations of the connected devices. As illustrated in FIG. 1, the HEMS gateway 100 may be connected to at least one of a photovoltaic (PV) inverter 110, meter (or a smart meter) 120, an energy storage system (ESS) 130, an electric vehicle (EV) charger 140, and a smart plug 150. However, the kinds of devices connected to the HEMS gateway 100 may be variously changed according to an embodiment.

The PV inverter 110 may convert DC power supplied from the PV module 111 into AC power. Particularly, the PV module 111 may generate power by using a photoelectric effect and supply the generated power to the home. Although the power generated by the PV module 111 is DC power, various power consumption devices provided in the home may operate by using AC power. Thus, the PV inverter 110 may convert the DC power into the AC power to supply the converted AC power to the home. Although the HEMS 10 includes the PV inverter 110 and the PV module 111 in this disclosure, the HEMS 10 may include various types of environmentally friendly power generation modules and inverters corresponding thereto. Examples of the power generation modules and the inverters may include a wind power generation module and an inverter corresponding to the wind power generation module.

The meter 120 may measure a usage amount of power supplied from a power system 121 to the home and consumed in the home. Particularly, the meter 120 according to an embodiment may be implemented as a smart meter. The smart meter may include a communication module for transmitting information on the power usage amount to the HEMS gateway 100.

The ESS 130 may store power supplied from the PV module 111, the power system 121, and/or a battery of an EV 141 or residual power remaining after the consumption of the supplied power. A structure and operation of the ESS 130 will be described below in more detail with reference to FIG. 2.

The EV charger 140 may be connected to the EV 141 to control charging and discharging with respect to the battery provided in the EV 141.

The smart plug 150 may include a power usage amount measurement module measuring a power usage amount of the connected home appliance and a communication module for transmitting the measured power usage amount to the HEMS gateway 100. Also, the power may be supplied or blocked to the connected home appliance according to a control signal received from the HEMS gateway 100.

According to an embodiment, when a separate communication module is provided in the home appliance 151, the HEMS gateway 100 may be connected to the home appliance 151 to control an operation of the home appliance 151.

According to an embodiment, when a separate sensor (for example, a smartThinQ™ sensor and the like) for detecting an operation of the home appliance 151 is attached to the home appliance 151, the HEMS gateway 100 may be connected to the corresponding sensor to confirm whether the home appliance 151 operates.

The sensor control device 200 may be connected to at least one of a camera 210, a motion detection sensor 220, a lighting device, and a door/window sensor 240 to receive various information from the connected sensor. The sensor control device 200 may transmit the various received information to the HEMS gateway 100 or the control device 300. Also, the sensor control device 200 may control an operation of the connected sensor. The type of the sensor connected to the sensor control device 200 is not limited thereto, and more various sensors may be connected to the sensor control device 200.

The camera 210 may transmit an image frame such as a still image or a moving image acquired by using an image sensor to the sensor control device 200. The sensor control device 200 may transmit the received image frame to the control device 300. The control device 300 may analyze the received image frame to detect various situations such as a user's presence/absence in the room, an invasion by an outsider, or a fire occurrence on the basis of the analyzed result. The received image frame may be directly analyzed to detect the above-described various situations according to an embodiment.

The motion detection sensor 220 may be mainly implemented as an infrared sensor. The motion detection sensor 220 may detect a change in infrared ray to transmit a signal corresponding to the detected change to the sensor control device 200. The sensor control device 200 may transmit the received signal to the control device 300, and the control device 300 may detect the user's presence/absence in the room on the basis of the received signal.

The lighting device 230 may be installed in various positions inside and outside the home (e.g., a front door, a kitchen, a living room, a toilet, etc.) to emit light. The sensor control device 200 may control ON/OFF of the lighting device 230, brightness, a color, or a flicker of light, and the like.

The door/window sensor 240 may detect open/close of a door or a window to determine whether the user is present/absent or be used for determining whether the outsider has invaded the house.

The control device 300 may be connected to each of the HEMS gateway 100 and the sensor control device 200. For example, the control device 300 may be connected to each of the HEMS gateway 100 and the sensor control device 200 through the Internet. The control device 300 may be provided in the home according to an embodiment. In this case, the control device 300 may be connected to each of the HEMS gateway 100 and the sensor control device 200 by using a LAN cable or the like in a wired manner. Alternatively, the control device 300 may be connected through short-range wireless communication such as Wi-Fi and Bluetooth in a wireless manner.

The control device 300 may receive various information associated with the devices 110, 120, 130, 140, 141, 150, and 151 from the HEMS gateway 100. Also, the control device 300 may receive various information generated by the sensors 210, 220, 230, and 240 from the sensor control device 200.

The control device 300 may perform overall power management in the home by using the received various information. The control device 300 may a power state in the home, the user's presence/absence in the room, and the like by using the various information received from the HEMS gateway 100 or the sensor control device 200. The control device 300 may generate control signals for controlling operations of various devices 110, 120, 130, 140, and 150 connected to the HEMS gateway 100 and the various sensors 210, 220, 230, and 240 connected to the sensor control device 200 to transmit the generated control signals to the HEMS gateway 100 or the sensor control device 200 on the basis of the confirmed results.

That is, a main component for controlling the overall operation of the HEMS 10 according to an embodiment may correspond to the control device 300. The control device 300 may be implemented in the form of a server.

Figure 3:
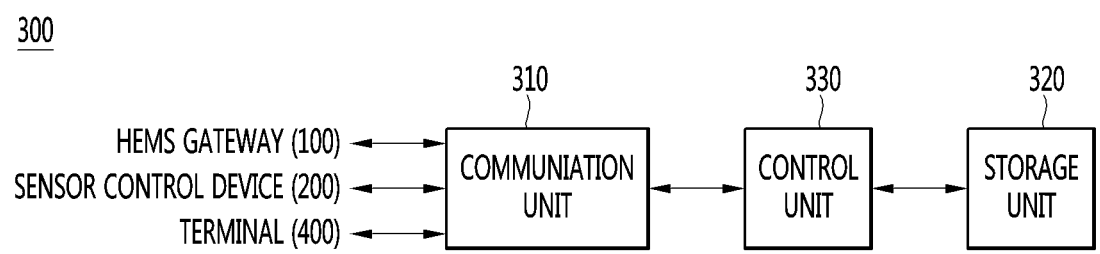
FIG. 3 is a schematic block diagram of a control device for controlling an operation of the HEMS according to an embodiment.

However, according to an embodiment, the HEMS gateway 100 and the sensor control device 200 may be directly connected to each other to exchange various information and the control signals therebetween. In this case, the HEMS gateway 100 may serve as the control device 300. In this case, the HEMS gateway 100 may include all of the components of the control device, which are illustrated in FIG. 3.

Also, the control device 300 may transmit the information received from the HEMS gateway 100 or the sensor control device 200 or the information on the power state, the user's presence/absence in the room, and the like, which are confirmed by using the received information.

The terminal 400 may be implemented as a PC, a notebook, a smart phone, a tablet PC, or the like. According to an embodiment, the terminal 400 may be installed in and executed by an application terminal 400 connected to the control device 300 to receive the above-described various information or for controlling the operations of the sensors 210, 220, 230, and 240.

Figure 2:
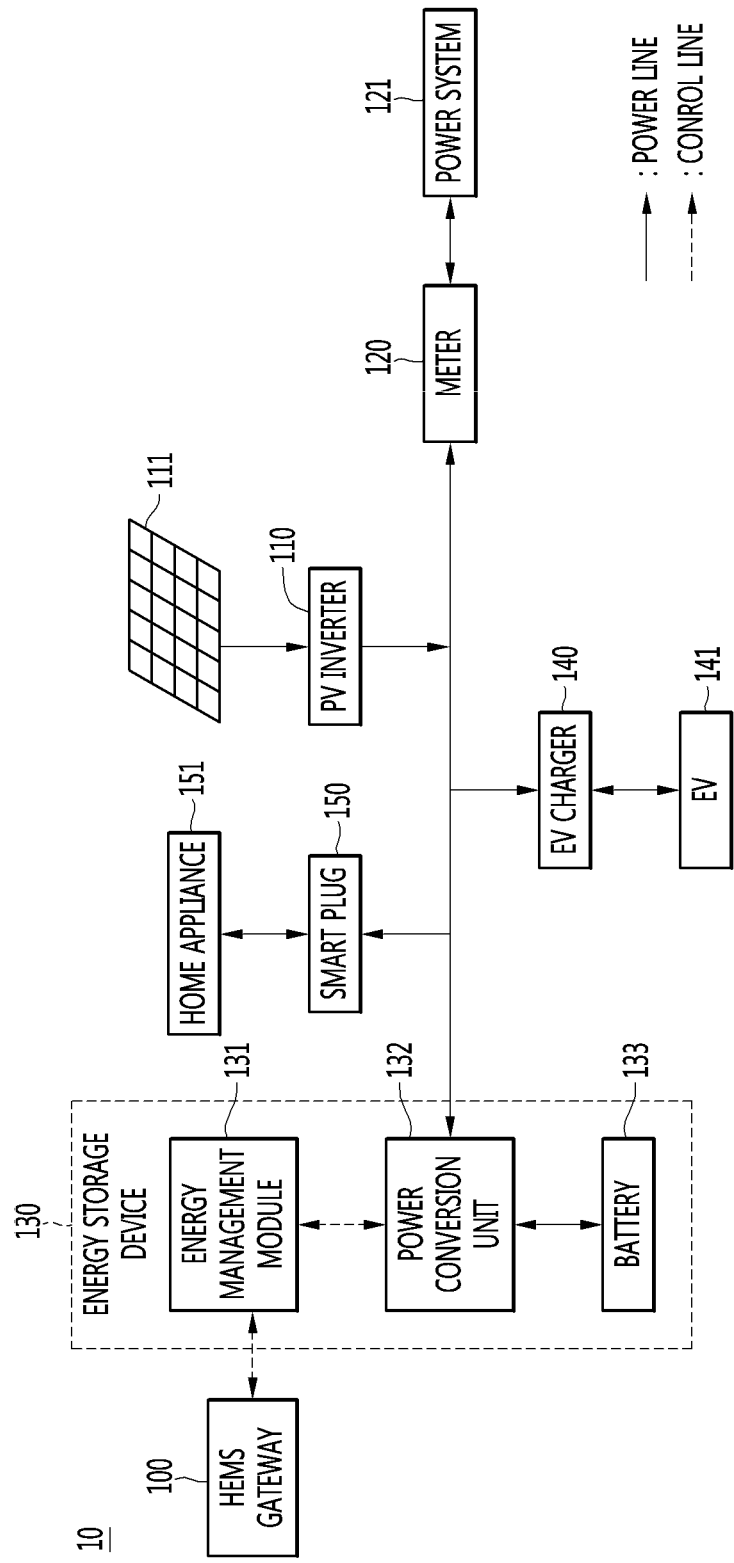
FIG. 2 is a view illustrating a power flow in the HEMS of FIG. 1.

FIG. 2 is a view illustrating a power flow of the HEMS of FIG. 1.

Before describing a power flow of the HEMS 10, the components of the ESS 130 and an operation of each of the components of the ESS 130 will be described.

The ESS 130 may include an energy management module 131, a power conversion unit 132, and a battery 133.

The energy management module 131 may operate under the control of the HEMS gateway 100 or the control device 300 connected to the HEMS gateway 100. The energy management module 131 may control an overall operation of the ESS 130.

The power conversion unit 132 may include a plurality of inverters and converters. For example, the power conversion unit 132 may convert the power stored in the battery 133 from DC power into AC power to supply the converted AC power to the outside. The power conversion unit 132 may convert the remaining AC power into the DC power. The power conversion unit 132 may include a DC/AC inverter for storing the converted DC power into the battery 133.

Although not shown, the HEMS 10 according to an embodiment may be configured in the form in which the PV module 111 is connected to the power conversion unit 132. Here, the power supplied from the PV module 111 may be converted by the power conversion unit 132, and the converted power may be stored in the battery 133 or supplied to the EV 141 or the home appliance 151. In this case, the power conversion unit 132 may include a DC/DC converter for converting the power supplied from the PV module 111 so that the converted power is stored in the battery 133.

The power conversion operation of the above-described power conversion unit 132 may be controlled by the energy management module 131.

Although not shown, the ESS 130 may include a power management module and a battery management module. The power management module may manage power of the ESS 130 such as the power conversion unit 132 and the battery management module. The battery management module may measure a temperature, current, a voltage, a charged amount, and the like of the battery 133 and monitor states of the battery 133. Also, the battery management module may control the battery 133 so that an operation environment of the battery 133 is optimized based on the monitored states of the battery 133. The energy management module 131 may control operations of the power management module and the battery management module.

Hereinafter, the power flow of the HEMS 10 according to an embodiment will be described.

Referring to FIG. 2, the PV inverter 110 may convert the DC power supplied from the PV module 111 into the AC power. The converted power may be supplied to the EV 141 connected to the EV charger 140 or the home appliance 151 connected to the smart plug 150 and then consumed. According to an embodiment, when remaining power is generated after the consumption, the generated remaining power may be discharged to the power system 121 or sold again or be stored in the battery 133 of the ESS 130.

The meter 120 may measure a power usage amount on the basis of the power supplied from the power system 121. The power supplied from the power system 121 may be consumed by the EV 141 or the home appliance 151 or converted into the form of the DC power by the power conversion unit 132 and then stored in the battery 133.

The EV charger 140 may charge the battery of the EV 141 by using the power generated by the PV module 111, the power supplied from the power system 121, or the power stored in the ESS 130. To charge the battery of the EV 141, the EV charger 140 may convert the AC power into the DC power.

Also, the EV charger 140 may discharge the power charged in the battery of the EV 141. In this case, the EV charger 140 may convert the power charged in the battery of the EV 141 from DC power into the AC power. The converted power may be supplied to the home appliance 151, stored in the ESS 130, discharged to the power system 121, or sold again.

The smart plug 150 may supply the power generated by the PV module 111, the power supplied from the power system 121, or the power stored in the ESS 130 to the home appliance 151.

As described with reference to FIGS. 1 and 2, since the HEMS gateway 100 are connected to various components 110, 120, 130, 140, and 150 that are provided for each power path within the home, the HEMS gateway 100 may acquire a power flow for each power path or various information associated with the power state. The control device 300 connected to the HEMS gateway 100 may control supply, consumption, and a storage operation of power in the home on the basis of the acquired information.

Hereinafter, components of the control device for controlling the overall operation of the HEMS 10 according to an embodiment will be described with reference to FIG. 3.

FIG. 3 is a schematic block diagram of a control device for controlling an operation of the HEMS 10 according to an embodiment.

Referring to FIG. 3, the control device 300 may include a communication unit 310, a storage unit 320, and a control unit 330. Since the components provided in the control device 300 are not limited thereto, the control device 300 according to an embodiment may include more components.

The communication unit 310 may include one or more modules for enabling wired communication or wireless communication between the control device 300 and the HEMS gateway 100, between the control device 300 and the sensor control device 200, and between the control device 300 and the terminal 400.

The control device 300 may receive various information or data associated with the operations between the HEMS gateway 100, the sensor control device 200, and/or terminal and the HEMS 10 to transmit a control signal or command for controlling the HEMS 10.

The storage unit 320 may store the various information or data received through the communication unit 310. Also, the storage unit 320 may store various algorithms, application program, or application for generating control signals or commands that control the operation of the HEMS 10 by using the received information or data.

The control unit 330 may control operations of the various components provided in the control device 300. Also, the control unit 330 may execute the algorithm, the application program, or the application stored in the storage unit 320 and process the received information or data to generate a control signal or command for controlling the operation of the HEMS 10.

Hereinafter, an operation of the HEMS according to an embodiment will be described.

Figure 4:
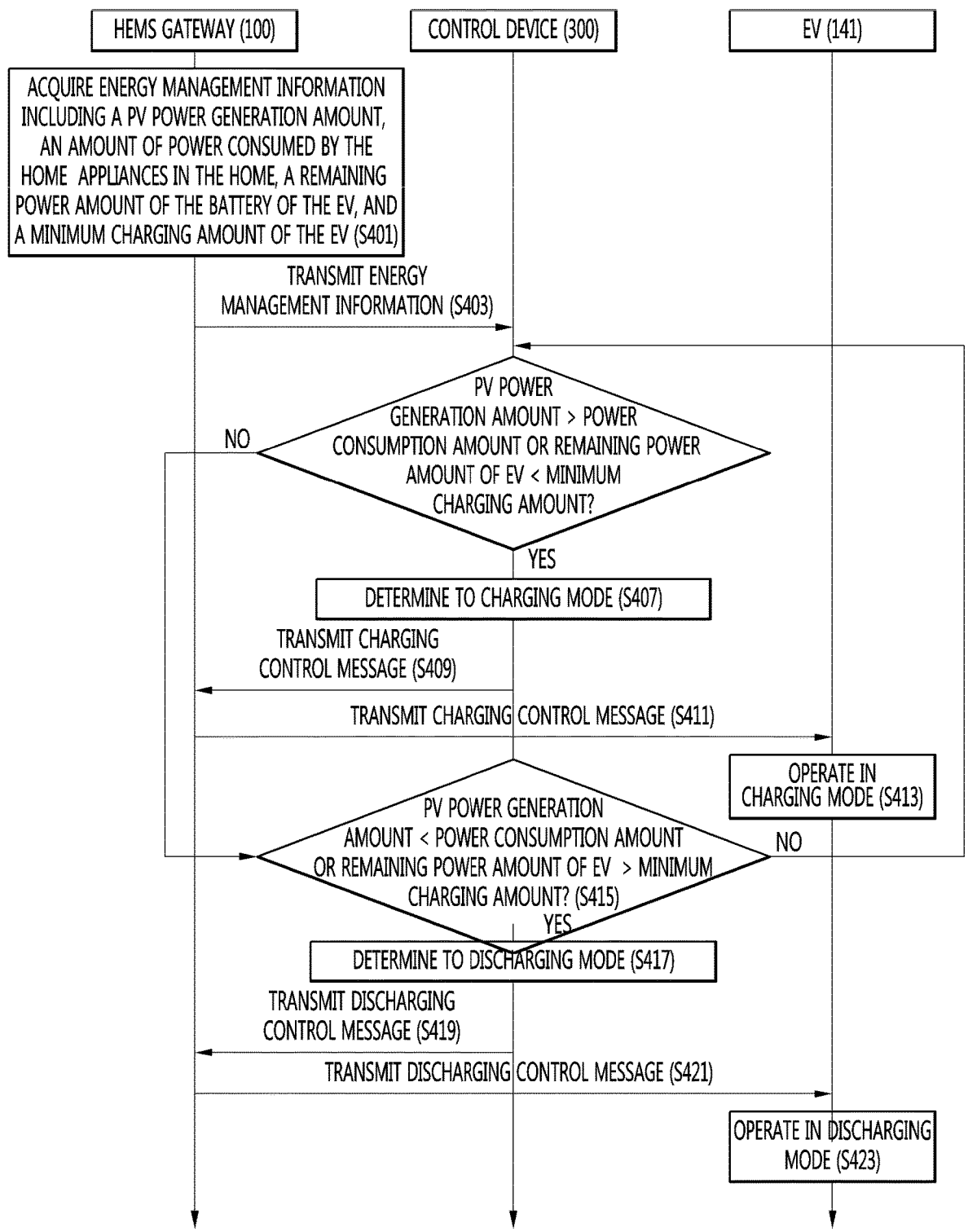
FIG. 4 is a ladder diagram illustrating an operation method of the HEMS according to an embodiment.

FIG. 4 is a ladder diagram illustrating an operation method of the HEMS according to an embodiment.

The HEMS gateway 100 acquires energy management information including a PV power generation amount, an amount of power consumed by the home appliances in the home, a remaining power amount of the battery of the EV 141, and a minimum charging amount of the EV 141 (S401).

The HEMS gateway 100 may receive an amount of power generated by the PV module 111 from the PV inverter 110.

An amount of power consumed by the home appliances may represent the total power consumption amount of all or a portion of the home appliances in the home.

The HEMS gateway 100 may acquire the total power consumption amount of the home appliances in the home. The HEMS gateway 100 may acquire the total power consumption amount of the home appliances from the smart plugs 150 connected to the home appliances.

The HEMS gateway 100 may receive a remaining power amount of the battery provided in the EV 141 from the EV 141 or the EV charger 140.

The HEMS gateway 100 may receive a minimum charging amount from the EV 141, the EV charger 140, or the terminal 400. The minimum charging amount of the EV 141 may be an amount set by the user of the terminal 400, but is not limited thereto. For example, the minimum charging amount may be a default amount.

The HEMS gateway 100 may include a wired communication interface or a wireless communication interface to receive energy management information.

The HEMS gateway 100 may transmit the acquired energy management information to the control device 300 (S403).

The HEMS gateway 100 may transmit the acquired energy management information to the control device 300 through the Internet. The communication unit 310 of the control device 300 may receive the energy management information from the wireless communication interface (not shown) provided in the HEMS gateway 100 through the Internet standard.

The HEMS gateway 100 may periodically transmit the acquired energy management information to the control device 300.

The HEMS gateway 100 may transmit the acquired energy management information to the control device 300 in real-time.

The control device 300 may determine the power mode of the EV on the basis of the energy management information received from the gateway 100. The power mode of the EV may include a charging mode and a discharging mode.

The charging mode may be a mode for charging the EV 141 by using at least one of power generated from the PV module 111 and power supplied from the power system 121. The charging mode according to this embodiment may be called a solar charging mode.

The discharging mode may be a mode for discharging and supplying the power stored in the battery of the EV 141 to the home appliance. The discharging mode of the EV 141 according to this embodiment may be called a vehicle to home (V2H) mode.

The control device 300 may determine the power mode of the EV 141 as the EV charging mode (S407) when the PV power generation amount is greater than the power consumption amount of the home appliance, or when the remaining power amount of the battery of the EV 141 is less than the minimum charging amount (S405).

In an embodiment, first energy management information may include the PV power generation amount and the power consumption amount of the home appliance, and second energy management information may include the remaining power amount of the battery of the EV 141 and the minimum charging amount of the EV 141.

The control unit 330 of the control device 300 may control the power of the battery provided in the EV 141 on the basis of the first energy management mode and the second energy management mode so that the EV 141 operates in one of the charging mode and the discharging mode.

In an embodiment, the control unit 330 of the control device 300 may control the HEMS gateway 100 or the EV 141 so that the power mode of the EV 141 becomes the charging mode when the PV power generation amount is greater than the power consumption amount of the home appliance.

In an embodiment, the control unit 330 of the control device 300 may control the HEMS gateway 100 or the EV 141 so that the power mode of the EV 141 becomes the charging mode when the remaining power amount of the battery of the EV 141 is less than the minimum charging amount.

In an embodiment, the control unit 330 of the control device 300 may control the HEMS gateway 100 or the EV 141 so that the power mode of the EV 141 becomes the charging mode when the PV power generation amount is greater than the power consumption amount of the home appliance, and the remaining power amount of the battery of the EV 141 is less than the minimum charging amount.

In an embodiment, the minimum charging amount may be a minimum power amount that has to be stored in the battery of the EV 141. The minimum charging amount of the EV 141 may be an amount set by the user of the terminal 400, but is not limited thereto. For example, the minimum charging amount may be a default amount.

An embodiment for setting the minimum charging amount of the EV 141 will be described with reference to FIGS. 5A and 5B.

Figure 5A:
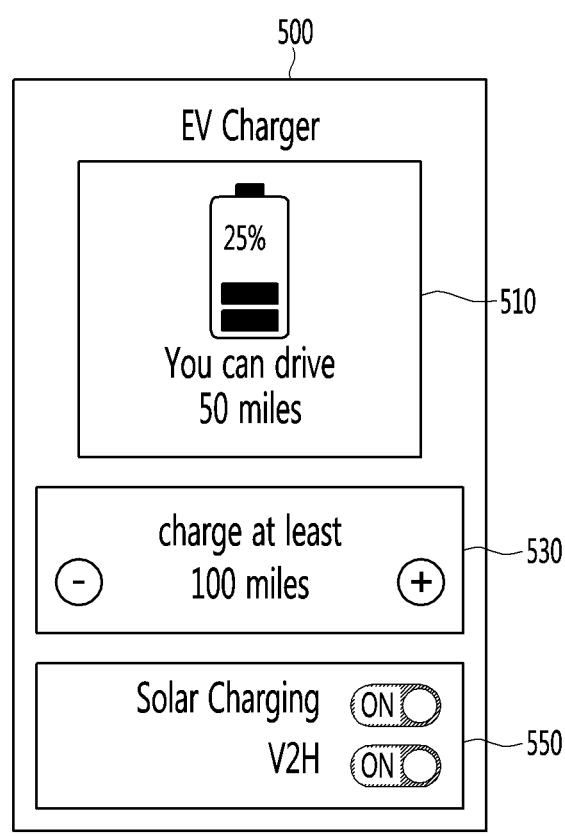
FIGS. 5A and 5B are views illustrating a user interface screen on which a process of setting a minimum charging amount of an EV through a terminal is displayed according to an embodiment.
Figure 5B:
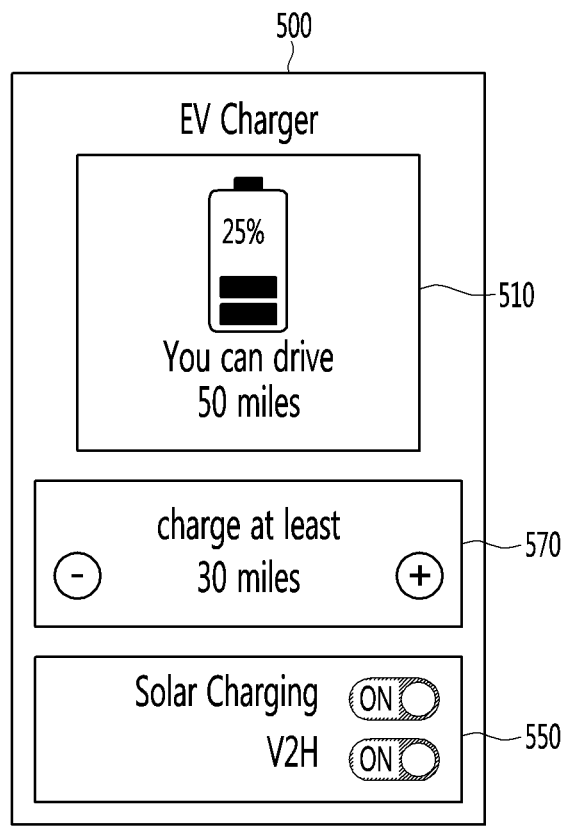

FIGS. 5A and 5B are views illustrating a user interface screen on which a process of setting the minimum charging amount of the EV through the terminal is displayed according to an embodiment.

In FIGS. 5A and 5B, a user interface screen 500 may be a screen displayed according to execution of power management application installed in the terminal 400.

FIG. 5A illustrates the user interface screen 500 displayed through the terminal 400 to set the minimum charging amount of the EV 141 and the power mode of the EV 141.

The user interface screen 500 may include a current charging amount item 510 of the EV 141, a minimum charging amount setting item 530, and a power mode setting item 550 of the EV 141.

The current charging amount item 510 may include a ratio (about 25%) of an amount of power charged in the battery of the EV 141 and a distance (about 50 miles) at which the EV 141 is capable of traveling through the current charging power amount.

The minimum charging amount setting item 530 may be an item for setting a power amount that has to be minimally stored in the battery of the EV 141. In FIG. 5A, the minimum charging amount setting item 530 may be realized in a method for setting a minimum travelable distance of the EV 141, but is not limited thereto. That is, as illustrated in FIG. 5B, the minimum charging amount setting item 570 may be realized in a method for setting a ratio of the minimum charging amount of the EV 141.

The power mode setting item 550 of the EV 141 may be an item for setting the power mode of the EV 141. The solar charging mode may be a charging mode, and the V2H mode may be a discharging mode. The user may activate or inactivate the power mode of the EV 141 through the power mode setting item 550.

The activation of the solar charging mode may represent that the power mode of the EV 141 is operable in the charging mode. Also, the inactivation of the solar charging mode may represent that the power mode of the EV 141 is not operable in the charging mode. For example, when the solar charging mode is inactivated, in operation S413 of FIG. 4, the EV 141 may not operate in the charging mode even though a charging control message is received from the HEMS gateway 100.

FIGS. 5A and 5B illustrate a state in which all the solar charging mode and the V2H mode are activated, and also, it is assumed that FIG. 4 illustrates a state in which all the solar charging mode and the V2H mode are activated.

Information set through the user interface screen 500 displayed by the terminal 400 may be transmitted to the HEMS gateway 100 or the control device 300. The terminal 400 may transmit the set information to the HEMS gateway 100 through the short-range wireless communication and transmit the set information to the control device 300 through the Internet communication.

According to an embodiment, the power mode of the EV 141 may be manually set.

Figure 5C:
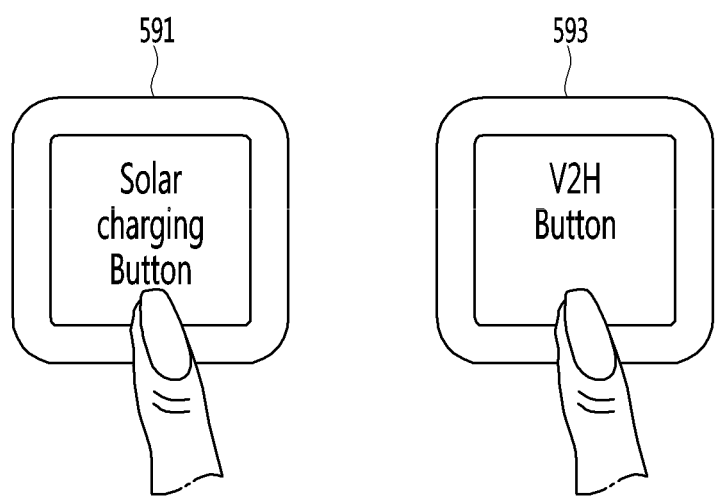
FIG. 5C is a view illustrating an example in which a power mode of the EV is set through a switch button according to an embodiment.

FIG. 5C is a view illustrating an example in which the power mode of the EV is set through a switch button according to an embodiment.

Referring to FIG. 5C, a charging mode button 591 for setting the power mode of the EV 141 to the solar charging mode (the charging mode) is illustrated. The charging mode button 591 may be provided in the home. When the charging mode button 591 is selected, a sensor control device 200 may transmit a message for informing that the charging mode button 591 is selected to the HEMS gateway 100. The HEMS gateway 100 may transmit the message received from the sensor control device 200 to the EV 141. Thus, the power mode of the EV 141 may be switched into the charging mode.

Referring to FIG. 5C, a discharging mode button 593 for setting the power mode to the V2H mode (the discharging mode) is illustrated. The discharging mode button 593 may be provided in the home. When the discharging mode button 593 is selected, the sensor control device 200 may transmit a message for informing that the discharging mode button 593 is selected to the HEMS gateway 100. The HEMS gateway 100 may transmit the message received from the sensor control device 200 to the EV 141. Thus, the power mode of the EV 141 may be switched into the discharging mode.

The description will be made again with reference to FIG. 4.

The control device 300 transmits the charging control message to the HEMS gateway 100 as the power mode of the EV 141 is determined as the charging mode (S409).

In an embodiment, the charging control message may be a message for setting the power mode of the EV 141 to the charging mode.

The charging control message may be a message for switching the power mode of the EV 141 from the discharging mode into the charging mode.

The control device 300 may transmit the charging control message to the HEMS gateway 100 through the communication unit 310.

The HEMS gateway 100 transmits the charging control message received from the control device 300 to the EV 141 (S411). The HEMS gateway 100 may transmit the charging control message to the EV 141 through the short-range wireless communication.

According to another embodiment, the HEMS gateway 100 may transmit the charging control message to the EV charger 140. The EV charger 140 may charge the EV 141 on the basis of the received charging control message.

The EV 141 operates in the charging mode on the basis of the charging control message received from the HEMS gateway 100 (S413).

The EV 141 may receive power from the PV module 111 or the power system 121 on the basis of the charging control message received from the HEMS gateway 100.

When the EV 141 receives the charging control message in the discharging mode, the EV 141 may terminate the discharging mode to switch the discharging mode into the charging mode. Thus, the EV 141 may stop the supply of the power to the home appliance and receive the power from the PV module 111 or the power system 121.

When the EV charger 140 receives the charging control message, the EV charger 140 may allow the EV 141 to supply the power supplied from the PV module 111 to the 141 on the basis of the charging control message.

When the EV 141 operates in the charging mode, the HEMS gateway 100 or the control device 300 may transmit information for informing that the EV 141 is operating in the charging mode to the terminal 400. The terminal 400 may provide the charging mode screen on the basis of the information for informing that the EV 141 is operating in the charging mode. This will be described with reference to FIG. 6.

Figure 6:
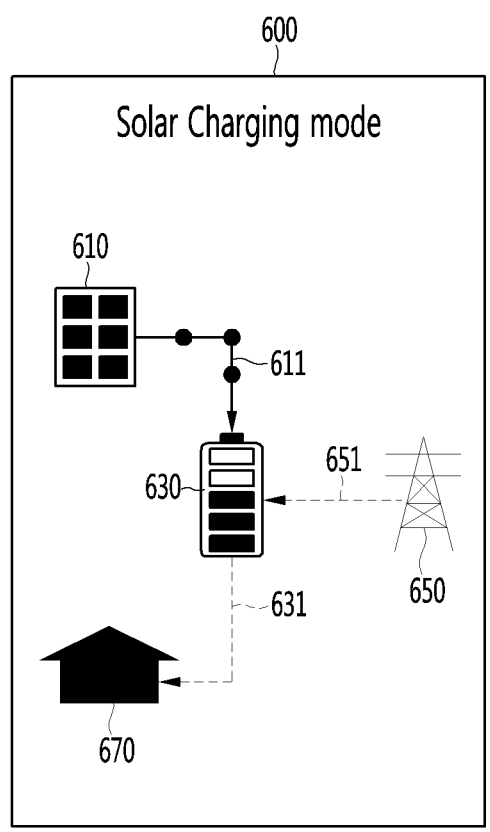
FIG. 6 is a view illustrating a charging mode screen provided through the terminal when the EV operates in a charging mode according to an embodiment.

FIG. 6 is a view illustrating the charging mode screen provided through the terminal when the EV operates in the charging mode according to an embodiment.

Referring to FIG. 6, the terminal 400 may display the charging mode screen 600 according to the execution of the power management application.

The charging mode screen 600 may include a PV module icon 610 representing the PV module 111, a battery icon 630 representing the battery of the EV 141, a power system icon 650 representing the power system 121, and a home icon 670 representing the home in which the home appliances are installed.

When the EV 141 operates in the charging mode, the terminal 400 may display a power supply line 611 for informing that the PV module 141 supplies the power to the battery of the EV 141. When the EV 141 operates in the charging mode, the terminal 400 may display power supply interruption lines 631 and 651 for informing that the battery of the EV 141 does not supply power to the home appliances, and also, power is not supplied to the battery of the EV 141.

The user may easily confirm that the EV 141 electrically charges the PV module 111 through the charging mode screen 600.

The description will be made again with reference to FIG. 4.

The control device 300 may determine the power mode of the EV 141 as the EV discharging mode (S417) when the PV power generation amount is less than the power consumption amount of the home appliance, or when the remaining power amount of the battery of the EV 141 is greater than the minimum charging amount (S415).

In an embodiment, the control unit 330 of the control device 300 may control the HEMS gateway 100 or the EV 141 so that the power mode of the EV 141 becomes the discharging mode when the PV power generation amount is less than the power consumption amount of the home appliance.

In an embodiment, the control unit 330 of the control device 300 may control the HEMS gateway 100 or the EV 141 so that the power mode of the EV 141 becomes the discharging mode when the remaining power amount of the battery of the EV 141 is greater than the minimum charging amount.

In an embodiment, the control unit 330 of the control device 300 may control the HEMS gateway 100 or the EV 141 so that the power mode of the EV 141 becomes the discharging mode when the PV power generation amount is less than the power consumption amount of the home appliance, and the remaining power amount of the battery of the EV 141 is greater than the minimum charging amount.

The control device 300 transmits an EV discharging control message to the HEMS gateway 100 as the power mode of the EV 141 is determined as the discharging mode (S419).

In an embodiment, the discharging control message may be a message for setting the power mode of the EV 141 to the discharging mode.

The discharging control message may be a message for switching the power mode of the EV 141 from the charging mode into the discharging mode.

The control device 300 may transmit the discharging control message to the HEMS gateway 100 through the communication unit 310.

The HEMS gateway 100 transmits the EV discharging control message received from the control device 300 to the EV 141 (S421). The HEMS gateway 100 may transmit the discharging control message to the EV 141 through the short-range wireless communication.

According to another embodiment, the HEMS gateway 100 may transmit the discharging control message to the EV charger 140. The EV charger 140 may charge the EV 141 on the basis of the received discharging control message.

The EV 141 operates in the discharging mode on the basis of the EV discharging control message received from the HEMS gateway 100 (S423).

When the EV 141 receives the discharging control message in the charging mode, the EV 141 may terminate the charging mode to switch the charging mode into the discharging mode. Thus, the EV 141 may not receive the power from the PV module 111, but supply the power to the home appliances in the home.

When the EV charger 140 receives the discharging control message, the EV charger 140 may control the battery of the EV 141 so that the power charged in the battery of the EV 141 is supplied to the EV 141 on the basis of the discharging control message.

When the EV 141 operates in the discharging mode, the HEMS gateway 100 or the control device 300 may transmit information for informing that the EV 141 is operating in the discharging mode to the terminal 400. The terminal 400 may provide the discharging mode screen on the basis of the information for informing that the EV 141 is operating in the discharging mode. This will be described with reference to FIG. 7.

Figure 7:
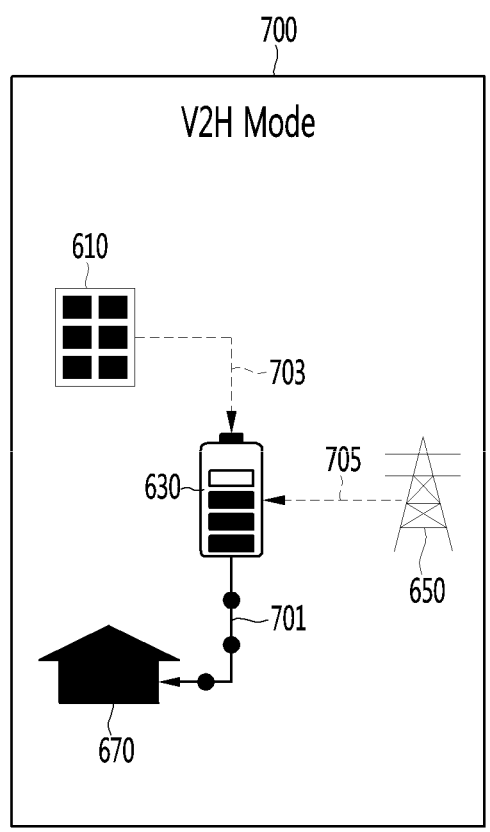
FIG. 7 is a view illustrating a discharging mode screen provided through the terminal when the EV operates in a discharging mode according to an embodiment.

FIG. 7 is a view illustrating the discharging mode screen provided through the terminal when the EV operates in the discharging mode according to an embodiment.

Referring to FIG. 7, the terminal 400 may display the discharging mode screen 700 according to the execution of the power management application.

The discharging mode screen 700 may include the PV module icon 610 representing the PV module 111, the battery icon 630 representing the battery of the EV 141, the power system icon 650 representing the power system 121, and the home icon 670 representing the home in which the home appliances are installed.

When the EV 141 operates in the discharging mode, the terminal 400 may display a power supply line 701 for informing that the power charged in the battery of the EV 141 is supplied to the home appliances in the home. When the EV 141 operates in the discharge mode, the terminal 400 may display a power supply interruption line 703 for informing that the battery of the EV 141 does not receive the power from the PV module 111 and a power supply interruption line 705 for informing that the EV 141 does not receive the power from the power system 121.

The user may easily confirm that the EV 141 electrically discharges the EV 141 through the discharging mode screen 700.

Figure 8:
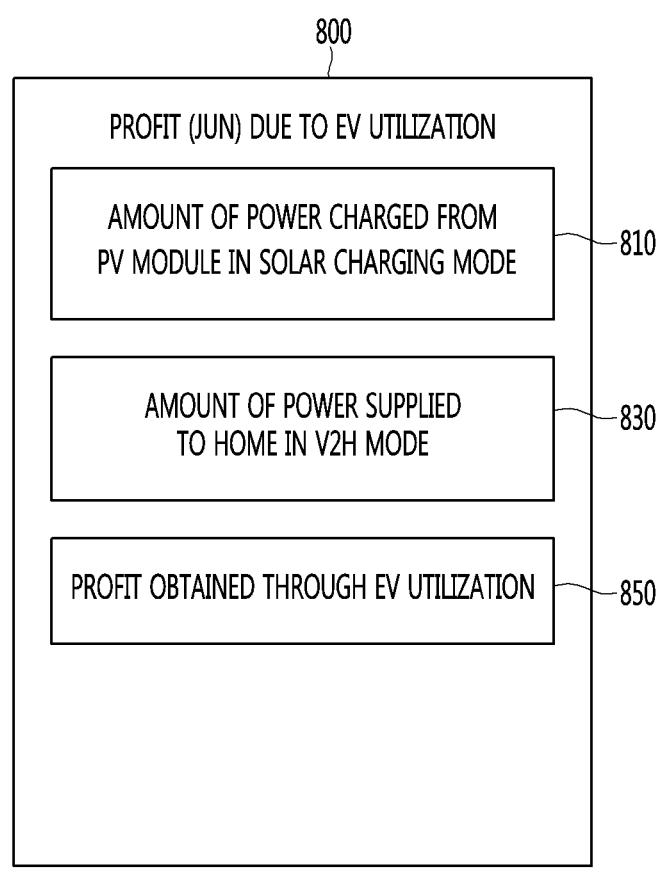
FIG. 8 is a view illustrating a screen on which information on acquired profits is displayed based on the power mode of the EV according to an embodiment.

FIG. 8 is a view illustrating a screen on which information on acquired profits is displayed based on the power mode of the EV 141 according to an embodiment.

FIG. 8 illustrates a power profit screen 800 providing information on power profits occurring as the EV 141 operates in the charging mode or the discharging mode.

After a predetermined period elapses, the HEMS gateway 100 or the control device 300 may provide information on a power amount charged under the charging mode of the EV 141 to the terminal 400 and transmit information on a power amount discharged under the discharging mode, and the terminal 400 may provide a power profit screen 800 on the basis of the information.

The power profit screen 800 may be a screen displayed by the terminal 400 according to the execution of the power management application.

The power profit screen 800 may include profit information earned for one method in June. Here, one month is just an example.

The power profit screen 800 may include information 830 on a power amount 810 charged in the battery of the EV 141 in the charging mode (or the solar charging mode) and a power amount supplied to the home in the charging mode (or the V2H mode), and profit information 850 that is acquired based on the information 830 on the power amount charged in the battery of the EV 141 and the information 830 with respect to the power amount supplied to the home in the charging mode (or the V2H mode).

The user may utilize the EV 141 as one energy storage system to efficiently perform the power management without purchasing a separate energy storage system.

According to another embodiment, the HEMS gateway 100 may include all the components of the control device 300 of FIG. 3. The HEMS gateway 100 may perform a function of the control device 300.

Particularly, the communication unit of the HEMS gateway 100 may receive the energy management information including the PV power generation amount, the power consumption amount of the home appliance, the remaining power amount of the battery of the electric vehicle, and the minimum charging amount of the electric vehicle. The communication unit of the HEMS gateway 100 may transmit the received energy management information to the control device 300.

The control unit of the HEMS gateway 100 may control the power of the battery provided in the EV 141 so that the EV 141 operates in one mode of the charging mode and the discharging mode on the basis of the energy management information. The power mode of the EV 141, which is determined based on the energy management information, may be described with reference to FIG. 4.

Figure 9:
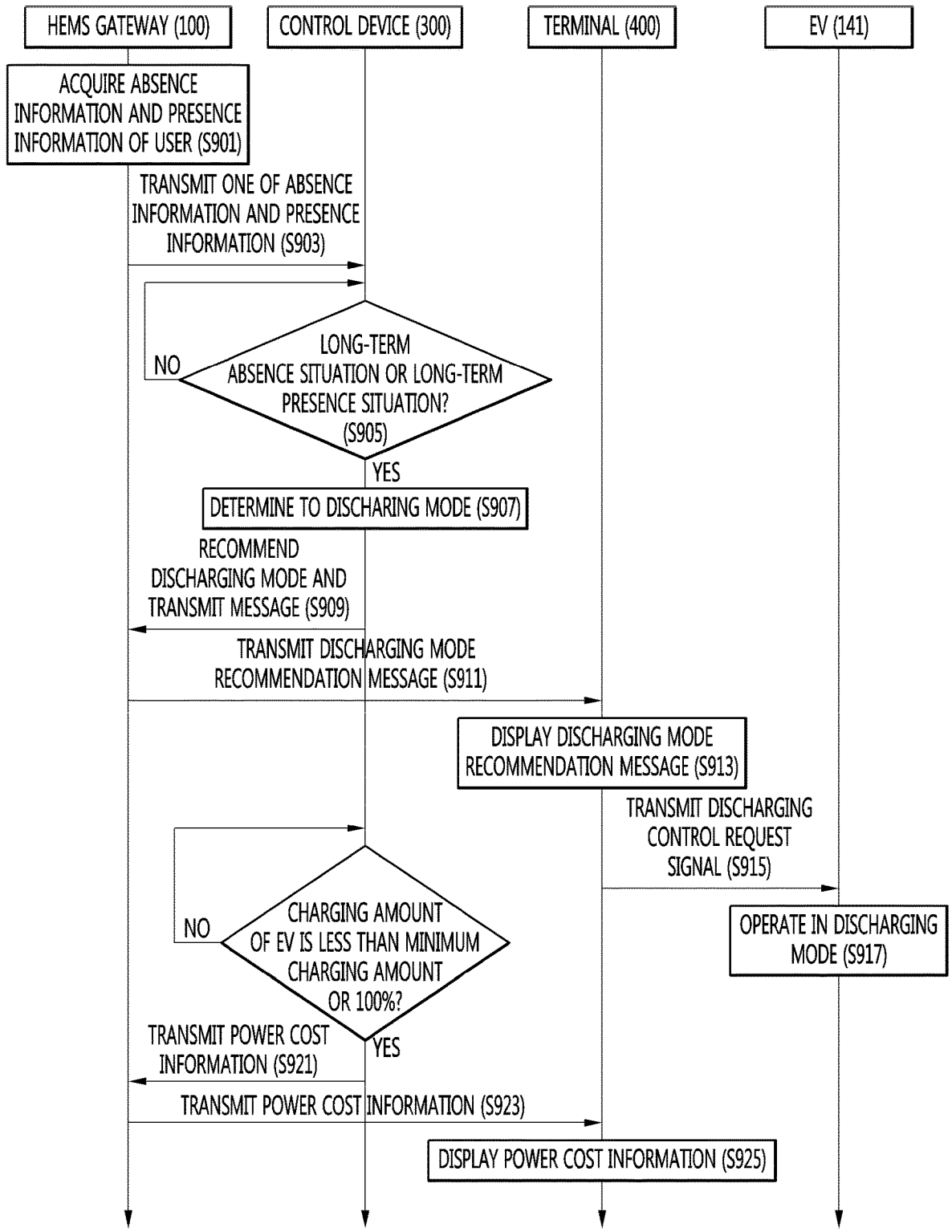
FIG. 9 is a ladder diagram illustrating an operation method of a HEMS according to further another embodiment.

FIG. 9 is a ladder diagram for explaining an operation method of a HEMS according to further another embodiment.

In the following drawing, it is assumed that a power mode of an EV 141 is in a charging mode. That is, it is assumed that the EV 141 is receiving power through an EV charger 140.

A HEMS gateway 100 acquires user absence information and user presence information (S901).

In an embodiment, the user absence information may include information of a time for which the user is absent in the home. Particularly, the absence information may include a difference between the current time and the last time at which the presence of the user in the home is detected.

In an embodiment, the user presence information may include information of a time for which the user is present in the home. Particularly, the presence information may include a difference between the current time and the last time at which the presence of the user in the home is detected and a difference between the last time at which the presence of the user in the home is detected and an initial time at which the presence of the user in the home is detected.

In an embodiment, the user absence information and presence information may be acquired through at least one of a camera 210, a motion detection sensor 220, and a door/window sensor 240, which are provided in the home.

The camera 210 provided in the home may photograph the inside of the home in real-time to transmit the photographed image to the HEMS gateway 100. The HEMS gateway 100 may transmit the photographed image to a control device 300. The control device 300 may determine whether the user is absent or present in the home through the photographed image.

The motion detection sensor 220 provided in the home may detect a motion of the user that is present in the home. The motion detection sensor 220 may transmit information on the detected motion of the user to the HEMS gateway 100. The HEMS gateway 100 may transmit the information on the detected motion of the user to the control device 300. The control device 300 may determine whether the user is absent or present in the home by using the information on the detected motion of the user.

The door/window sensor 240 provided in the home may detect opening and closing states of a door or a window in the home to transmit the detected information to the HEMS gateway 100. The HEMS gateway 100 may transmit the information on the detected opening and closing states of the door or window to the control device 300. The control device 300 may determine whether the user is absent or present in the home by using the information on the detected opening and closing states of the door or window.

The HEMS gateway 100 may include a wired communication interface or a wireless communication interface to receive the absence information and the presence information from a sensor control device 200.

The HEMS gateway 100 may transmit one of the acquired absence information and the acquired presence information to a communication unit 310 of the control device 300 (S903).

The HEMS gateway 100 may transmit the acquired absence information and presence information to the control device 300 through the Internet. The communication unit 310 of the control device 300 may receive the absence information and presence information from the wireless communication interface (not shown) provided in the HEMS gateway 100 through the Internet standard.

The HEMS gateway 100 may periodically transmit the acquired absence information and presence information to the control device 300. For example, the HEMS gateway 100 may transmit the acquired absence information and presence information to the control device 300 every hour.

The control device 300 may determine the power mode of the EV on the basis of the absence information and presence information received from the gateway 100. The power mode of the EV may include a charging mode and a discharging mode.

The charging mode may be a mode for charging the EV 141 by using at least one of power generated from the PV module 111 and power supplied from the power system 121. The charging mode according to this embodiment may be called a PV charging mode.

The discharging mode may be a mode for discharging and supplying the power stored in the battery of the EV 141 to the home appliance. The discharging mode of the EV according to this embodiment may be called a vehicle to home (V2H) mode.

The control device 300 determines whether the user is absent or present for a long time on the basis of one of the absence information and the presence information received from the gateway 100 (S905).

When the user is absent or present for a long time, the control unit 330 of the control device 300 determines the power mode of the EV 141 as the discharging mode (S907).

In an embodiment, when a difference between the current time and the last time at which the presence of the user in the home is detected is greater than a first reference time, the control unit 330 may determine that the user is absent for a long time. For example, the first reference time may be one hour, but is only an example.

In an embodiment, when the difference between the current time and the last time at which the presence of the user in the home is detected is less than a second reference time, or a difference between an initial time at which the presence of the user in the home is detected and the last time at which the presence of the user in the home is detected is greater than a third reference time, it may be determined that the user is present in the home for a long time. Here, the second reference time may be about 30 minutes, and the third reference time may be about 45 minutes, but this is only an example.

The first reference time, the second reference time, and the third reference time may be the same, but need not be limited thereto. For example, the first reference time, the second reference time, and the third reference time may be different from each other.

In another embodiment, when the difference between the current time and the last time at which the presence of the user in the home is detected is less than a second reference time, and a difference between an initial time at which the presence of the user in the home is detected and the last time at which the presence of the user in the home is detected is greater than a third reference time, it may be determined that the user is present in the home for a long time.

In an embodiment, when the user is absent or present in the home for a long time, the control unit 330 of the control device 300 may determine the power mode of the EV 141 as the discharging mode.

The control unit 330 may control the HEMS gateway 100 or the EV 141 so that the power mode of the EV 141 becomes the discharging mode.

The control unit 330 of the control device 300 transmits a discharging mode recommendation message to the HEMS gateway 100 as the power mode of the EV 141 is determined as the discharging mode (S909).

In an embodiment, the discharging mode recommendation message may be a message for setting the power mode of the EV 141 to the discharging mode.

The control device 300 may transmit the discharging mode recommendation message to the HEMS gateway 100 through the communication unit 310.

According to another embodiment, when the power mode of the EV 141 is determined as the discharging mode, the control unit 330 may directly transmit the discharging mode recommendation message to the terminal 400.

The HEMS gateway 100 transmits the discharging mode recommendation message received from the control device 300 to the terminal 400 (S911). The HEMS gateway 100 may transmit the discharging mode recommendation message to the terminal 400 through the short-range wireless communication.

According to another embodiment, the HEMS gateway 100 may transmit the charging control message to the EV charger 140. The EV charger 140 may charge the EV 141 on the basis of the received charging control message.

The terminal 400 displays the discharging mode recommendation message received from the HEMS gateway 100 (S913).

The terminal 400 may transmit a discharging control request signal to the EV 141 on the basis of the power mode control screen including the discharging mode recommendation message, and the EV 141 may operate in the discharging mode according to the discharging control request signal.

The operations S913 to S917 will be described with reference to the following drawings.

Figure 10:
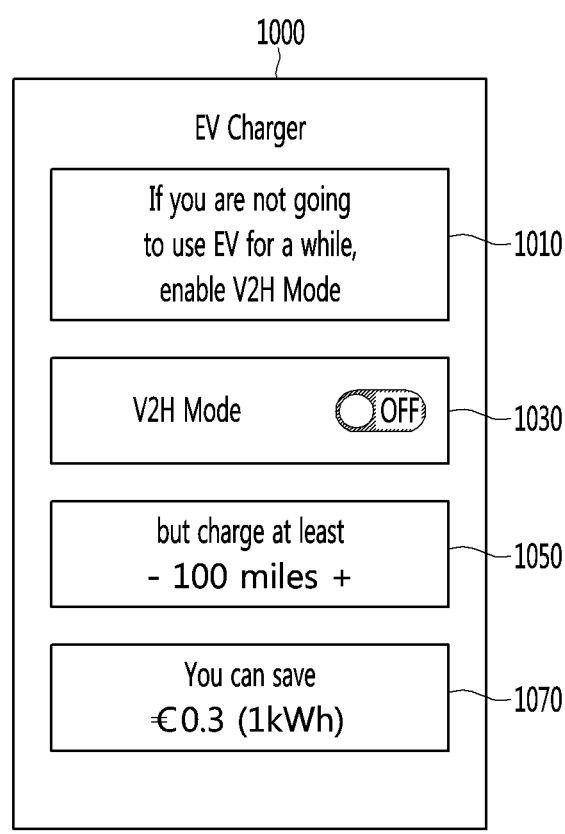
FIG. 10 is a view illustrating a power mode control screen for controlling the power mode of the EV according to an embodiment.

FIG. 10 is a view illustrating a power mode control screen for controlling the power mode of the EV according to an embodiment.

FIG. 10 illustrates a power mode control screen 1000 including the discharging mode recommendation message received from the control device 300. The power mode control screen 1000 may be displayed through the terminal 400.

The power mode control screen 1000 may be a screen generated based on the information transmitted through the control device 300.

The power mode control screen 1000 may be a screen displayed according to the execution of the power management application installed in the terminal 400.

When the terminal 400 receives the discharging mode recommendation message through the control device 300, the power management application may be automatically executed to display the power mode control screen 1000.

The power mode control screen 1000 may include a discharging mode recommendation message 1010, a discharging mode setting item 1030, a minimum charging amount setting item 1050, and a power saving cost item 1070.

The discharging mode recommendation message 1010 may include a text that informs the long-term absence situation or the long-term presence situation of the user and recommends the power mode of the EV 141 so that the power mode is switched into the discharging mode. That is, when the user does not use the EV 141 for a long time, the discharging mode recommendation message 1010 may include a text that recommends the power mode so that the EV 141 is used as one energy storage system.

The discharging mode setting item 1030 may be an item for setting the power mode of the EV 141 to the discharging mode (V2H mode). The user may activate or inactivate the discharging mode of the EV 141 through the discharging mode setting item 1030. When the discharging mode is inactivated, it is seen that the EV 141 basically operates in the charging mode. When the discharging mode is activated, the power mode of the EV 141 may be switched from the charging mode to the discharging mode.

The minimum charging amount setting item 1050 may be an item for setting a power amount that has to be minimally stored in the battery of the EV 141. In FIG. 10, the minimum charging amount setting item 1050 may be realized in a method for setting a minimum travelable distance of the EV 141, but is not limited thereto. For example, the minimum charging amount setting item 1050 may be realized in a method for setting a ratio of the minimum charging amount.

The power saving cost item 1070 may include a saving cost per unit power, which is capable of being reduced as the power mode of the EV 141 is switched into the discharging mode. For example, in FIG. 10, when the power mode of the EV 141 is switched into the discharging mode, the power saving cost item 1070 may indicate that a power cost of about 3.3 Euro per about 1 kWh is saved.

Information set through the power mode control screen 1000 displayed by the terminal 400 may be transmitted to the HEMS gateway 100 or the control device 300. The terminal 400 may transmit the set information to the HEMS gateway 100 through the short-range wireless communication and transmit the set information to the control device 300 through the Internet communication.

According to an embodiment, the power mode of the EV 141 may be set through a switching button. This will be described with reference to FIG. 5C.

Referring to FIG. 5C, a charging mode button 591 for setting the power mode of the EV 141 to a solar charging mode (the charging mode) is illustrated. The charging mode button 591 may be provided in the home. When the charging mode button 591 is selected, a sensor control device 200 may transmit a message for informing that the charging mode button 591 is selected to the HEMS gateway 100. The HEMS gateway 100 may transmit the message received from the sensor control device 200 to the EV 141. Thus, the power mode of the EV 141 may be switched into the charging mode.

Referring to FIG. 5C, a discharging mode button 593 for setting the power mode to the V2H mode (the discharge mode) is illustrated. The discharging mode button 591 may be provided in the house. When the discharging mode button 593 is selected, the sensor control device 200 may transmit a message for informing that the discharging mode button 593 is selected to the HEMS gateway 100. The HEMS gateway 100 may transmit the message received from the sensor control device 200 to the EV 141. Thus, the power mode of the EV 141 may be switched into the discharging mode.

When the EV 141 operates in the charging mode, the HEMS gateway 100 or the control device 300 may transmit information, in which the EV 141 is operating in the charging mode, to the terminal 400. The terminal 400 may provide the charging mode screen on the basis of the information for informing that the EV 141 is operating in the charging mode. This is as described in FIG. 6.

When the EV 141 operates in the discharging mode, the HEMS gateway 100 or the control device 300 may transmit information for informing that the EV 141 is operating in the discharging mode to the terminal 400. The terminal 400 may provide the discharging mode screen on the basis of the information for informing that the EV 141 is operating in the discharging mode. This is as described in FIG. 7.

The description will be made again with reference to FIG. 9.

The control unit 330 of the control device 300 determines that the charging amount of the EV 141 is less than the minimum charging amount or is about 100% (S919).

The charging amount of the EV 141 may be a charging amount of a battery provided in the EV 141.

The control unit 330 may receive information on the charging amount of the battery of the EV 141 from the EV 141 or the EV charger 140.

When the charging amount of the EV 141 is less than the minimum charging amount or is about 100%, the control unit 330 transmits power cost information to the HEMS gateway 100 (S921).

In an embodiment, the power cost information may include profits earned based on the power provided from the PV module 111 under the charging mode of the EV 141 and a power cost saved under the discharging mode of the EV 141.

The HEMS gateway 100 transmits the power cost information received from the control device 300 to the terminal 400, and the terminal 400 displays the received power cost information (S925).

An example for providing the power cost information will be described with reference to FIG. 11.

Figure 11:
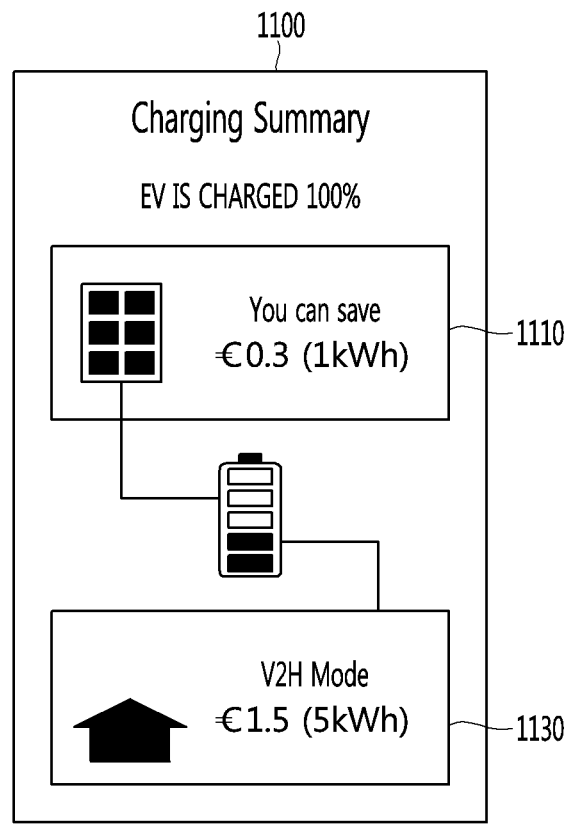
FIG. 11 is a view illustrating a screen on which information on acquired profits is displayed based on the power mode of the EV according to an embodiment.

FIG. 11 is a view illustrating a screen on which information on acquired profits is displayed based on the power mode of the EV according to an embodiment.

FIG. 11 illustrates a power profit screen 1100 providing information on power profits occurring as the EV 141 operates in the charging mode or the discharging mode.

Particularly, FIG. 11 illustrates an example of a power profit screen 1100 displayed when the charging amount of the EV 141 is about 100%. That is, when the charging amount of the EV 141 is about 100%, the control device 300 may transmit information for providing the power profit screen 1100 to the terminal 400.

The HEMS gateway 100 or the control device 300 may provide information on a power amount charged under the charging mode of the EV 141 to the terminal 400 and transmit information on a power amount discharged under the discharging mode, and the terminal 400 may provide the power profit screen 1100 on the basis of the information.

The power profit screen 1100 may be a screen displayed by the terminal 400 according to the execution of the power management application.

The power profit screen 1100 may include information 1110 with respect to a cost corresponding to the power amount charged in the battery of the EV 141 through the PV module 111 in the charging mode (or the solar charging mode) of the EV 141 and information 1130 with respect to profits corresponding to the power amount supplied to the home in the discharging mode (or the V2H mode) and the power amount supplied to the home.

The user may easily confirm the profits obtained in the power mode of the EV 141 through the power profit screen 1100.

According to various embodiments, the user may utilize the EV 141 as one energy storage system to efficiently perform the power management without purchasing a separate energy storage system.

According to further another embodiment, when the long-term absence situation or the long-term presence situation is detected based on one of the absence information and the presence information, the control device 300 may control the power of the battery of the EV 141 so that the power mode of the EV 141 is switched into the discharging mode.

Particularly, the control device 300 may determine the power mode of the EV 141 as the discharging mode when the long-term absence situation or the long-term presence situation is detected. Thereafter, the control device 300 may transmit the discharging control request signal to the EV 141. Thus, the EV 141 may operate in the discharging mode.

According to further another embodiment, the HEMS gateway 100 may include all the components of the control device 300 of FIG. 3. The HEMS gateway 100 may perform a function of the control device 300.

Particularly, the communication unit of the HEMS gateway 100 may receive at least one of the absence information and the presence information of the user to transmit the received information to the control device 300. The communication unit of the HEMS gateway 100 may transmit the received information to the control device 300.

When the long-term absence situation or the long-term presence situation is detected based on one of the absence information and the presence information, the control device 300 may transmit a discharging mode recommendation message, which recommends the power mode so that the power mode of the EV 141 is switched into the discharging mode, to the terminal 400.

Figure 12:
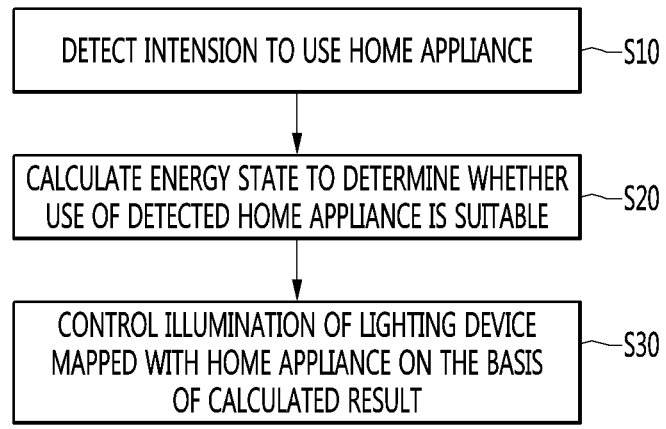
FIG. 12 is a flowchart illustrating a method for controlling the HEMS of the control device according to an embodiment.

FIG. 12 is a flowchart illustrating a method for controlling the HEMS of the control device according to an embodiment.

The control device 300 may detect user's intention to use the home appliance (S10).

Particularly, the control device 300 may detect the user's intention to use the home appliance 151 on the basis of the various information received from the HEMS gateway 100 or the sensor control device 200.

The control device 300 may detect the user's intention to use the home appliance when the user approaches the home appliance 151 to use the home appliance 151, comes into contact with the home appliance 151, or turns the home appliance on.

Embodiments related to the operation for the user's intention to use the home appliance through the control device 300 will be described in more detail with reference to FIGS. 14A and 14B.

Although not shown, in prior to operation S100, the control device 300 may store mapping data between the lighting devices, the smart plugs, and the home appliances, which are provided in the home. This will be described with reference to FIGS. 13A to 13B.

Figure 13A:
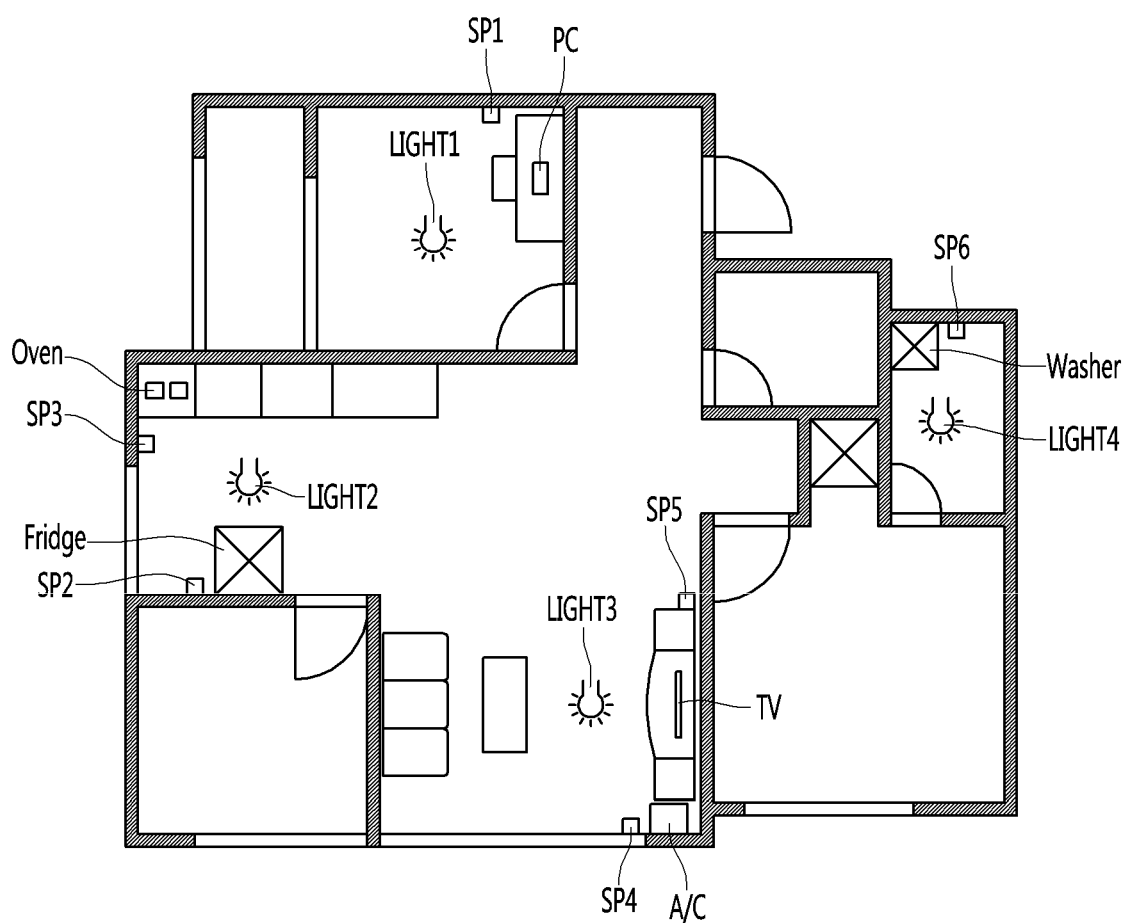

FIGS. 13a and 13b are views illustrating an example of mapping data stored in the control device according to mapping results between lighting devices, smart plugs, and home appliances in the home.

Referring to FIGS. 13A and 13B, a plurality of zones may exist in the house (home). For example, the plurality of zones may include an entrance, a study, a kitchen, a living room, a bedroom, a children's room, and/or a bathroom. The lighting device 230 may be installed in each of the plurality of zones. Also, the smart plug 150 may be installed in each of the plurality of zones. The home appliance 151 may be connected to the smart plug 150.

The mapping relationship between the lighting device 230, the smart plug 150, and the home appliance 151 may be set based on installed positions (zones) of the home appliance 151 may be connected to the smart plug 150.

Referring to the layout shown in FIG. 13A, a first lighting device LIGHT1, a first smart plug SP1, and a PC connected to the first smart plug SP1 may be installed in the study. In this case, the first lighting device LIGHT1 may be mapped with the first smart plug SP1 and the PC.

A second lighting device LIGHT2, a second smart plug SP2, a third smart plug SP3, a fridge connected to the second smart plug SP2, and an oven connected to the third smart plug SP3 may be installed in the kitchen. In this case, the second lighting device LIGHT2 may be mapped with the second smart plug SP2 and the fridge and also mapped with the third smart plug SP3 and the oven.

A third lighting device LIGHT3, a fourth smart plug SP4, a fifth smart plug SP5, an air conditioner (A/C) connected to the fourth smart plug SP4, and a TV connected to the fifth smart plug SP5 may be installed in the living room. In this case, the third lighting device LIGHT3 may be mapped with the fourth smart plug SP4 and the air conditioner and also mapped with the fifth smart plug SP5 and the TV.

A fourth lighting device LIGHT4, a sixth smart plug SP6, and a washer connected to the sixth smart plug SP6 may be installed in the bathroom. In this case, the fourth lighting device LIGHT4 may be mapped with the sixth smart plug SP6 and the washer.

The mapping operation may be performed through the terminal 400. That is, the terminal 400 may provide an interface for the mapping operation, and the user may set a mapping relationship between the components by using the interface. The terminal 400 may transmit mapping data generated based on the set mapping relationship to the control device 300.

The control device 300 may store mapping data between the lighting device 230, the smart plug 150, and the home appliance 151. Although the mapping data stored in the control device 300 is shown in table TABLE of FIG. 13B according to an embodiment, the present disclosure is not limited to the form of the mapping data.

Referring to the table TABLE of FIG. 13B, the mapping relationships between the lighting device LIGHT1 to LIGHT4, the smart plugs SP1 to SP6, and the home appliances as described above may be stored. According to an embodiment, the table TABLE may additionally store information on average power consumption of each of the home appliances.

The average power consumption information of each of the home appliances may be cumulatively measured by the smart plug 150. That is, the smart plug 150 may transmit the power consumption information of the home appliance 151 connected thereto to the control device 300, and the control device 300 may generate the average power consumption information of the home appliance 151 on the basis of the received power consumption information. According to an embodiment, the smart plug 150 may directly generate the average power consumption information.

Figure 14B:
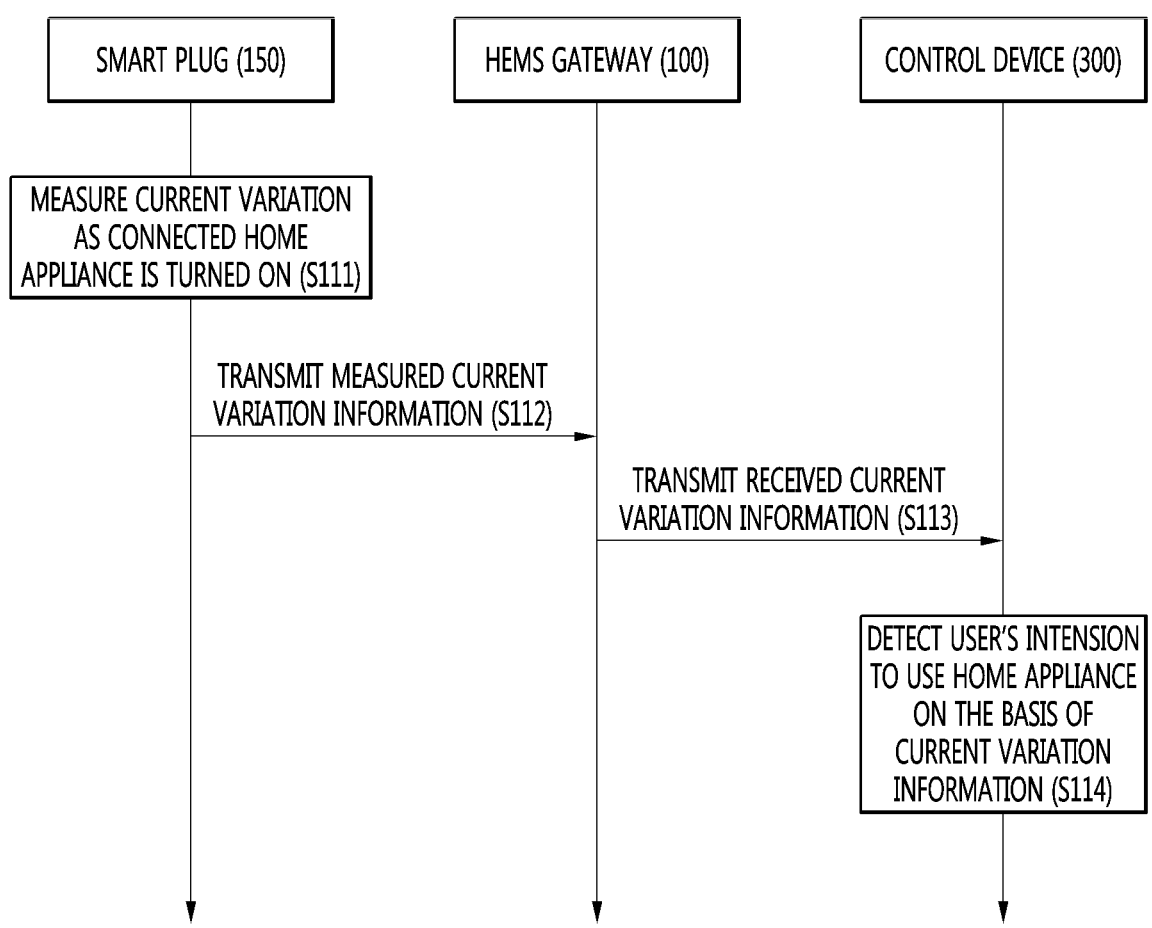

FIGS. 14a to 14b are ladder diagrams illustrating an example of a method for detecting an intention to use the home appliance through the control device according to an embodiment, respectively.

According to an embodiment, the control device 300 may detect the intention to use the home appliance 151 by using the camera 210 or the motion detection sensor 220 and detect the intention to use the home appliance 151 by using the smart plug 150.

Particularly, the camera 210 may acquire an image using the user, and the motion detection sensor 220 may detect movement of the user (S101). For example, the camera or the motion detection sensor 220 may be installed in each of the zones in the home or installed in each of the home appliances 151. Thus, when the user approaches a specific home appliance of the plurality of home appliances, the camera 210 may acquire an image including the specific home appliance and the user or detect the movement of the user to the specific home appliance. The image may be used to include both a still image and a moving image.

The camera 210 or the motion detection sensor 220 may transmit the acquired image or detection data to the sensor control device 200 (S102). The camera 210 or the motion detection sensor 220 may periodically acquire the image or the detection data to transmit the acquired image or detection data to the sensor control device 200.

The sensor control device 200 may transmit the received image or detection data to the control device 300 (S103). According to an embodiment, as illustrated in FIG. 1, when the sensor control device 200 is connected to the HEMS gateway 100, the sensor control device 200 may transmit the received image or detection data to the HEMS gateway 100. The HEMS gateway 100 may transmit the received image or detection data to the control device 300.

The control device 300 may analyze the acquired image or detection data (S104) to detect the user's intention to use the home appliance on the basis of the analyzed result (S105).

For example, when the image acquired by the camera 210 is received, the control device 300 may analyze the acquired image by using various known image recognition algorithms or the like. As the analyzed result, when the user in the acquired image approaches or contacts the home appliance 151 for a predetermined time or more, or the turn-on operation of the user, which turns the home appliance 151 on, is detected, the control device 300 may detect that the user intends to use the home appliance 151. The control device 300 may detect the user's intention to use the home appliance according to various examples that are determined based on the analyzed result of the acquired image.

According to an embodiment, when the detection data generated from the motion detection sensor 220 is received, the control device 300 may analyze the detection data. Similar to the analyzed result, in the analyzed result of the detection data, when the user in the acquired image approaches or contacts the home appliance 151 for a predetermined time or more, or the turn-on operation of the user, which turns the home appliance 151 on, is detected, the control device 300 may detect that the user intends to use the home appliance 151.

Referring to FIG. 14B, the control device 300 may detect the intention to use the home appliance 151 connected to the smart plug 150 by using the smart plug 150.

Particularly, a variation in current when the home appliance 151 connected to the smart plug 150 is turned on may be measured (S111).

The smart plug 150 may measure the current supplied to the home appliance 151 connected thereto in real-time or periodically. According to an embodiment, the smart plug 150 may also measure power consumption of the home appliance 151 on the basis of the measured result of the current.

The home appliance 151 connected to the smart plug 150 may not consume power or consume minimum power when the home appliance 151 is turned off. When the home appliance 151 is turned on by the user, an amount of current supplied to the home appliance 151 may vary, and thus, the power consumption of the home appliance 151 may vary. For example, an amount of current supplied to the home appliance 151 may increase, and thus, the power consumption may also increase.

The smart plug 150 may measure a variation in current due to the turn-on of the home appliance 151. As the home appliance 151 is turned on, since an amount of current supplied to the home appliance 151 increases, the current measured by the smart plug 150 may also increase.

Information on the measured current variation may be transmitted to the HEMS gateway 100 (S112).

The information on the current variation may represent current measured by the smart plug 150 after the home appliance 151 is turned on. As described above, the smart plug 150 may measure an amount of current in real-time or periodically to transmit the measured current information to the HEMS gateway 100. Thus, the smart plug 150 may also transmit the current information measured after the home appliance 151 is turned on to the HEMS gateway 100.

According to an embodiment, the smart plug 150 may transmit the information on the variation in current on the basis of a variation between the current measured before the home appliance 151 is turned on and the current measured after the home appliance 151 is tuned on. That is, the smart plug 150 may measure an amount of current in real-time or periodically. When a degree of the measured current variation as the home appliance 151 is turned on is above a reference value, the smart plug 150 may transmit the current variation information to the HEMS gateway 100.

The HEMS gateway 100 may transmit the current variation information received from the smart plug 150 to the control device 300 (S113).

As described above, when the smart plug 150 transmits the current information measured in real-time or periodically to the HEMS gateway 100, the HEMS gateway 100 may transmit the current information received in real-time or periodically to the control device 300.

According to an embodiment, when the current variation information is transmitted to the HEMS gateway 100 only when the degree of the measured current variation is above the reference value, the HEMS gateway 100 may transmit the received current variation information to the control device 300.

The control device 300 may detect the user's intention to use the home appliance on the basis of the received current variation information (S114).

The control device 300 may detect the turn-on of the home appliance 151 on the basis of the current information received in real-time or periodically from the HEMS gateway 100. Particularly, the control device 300 may measure the degree of the current variation from the received current information to detect that the home appliance 151 is turned on when the degree of the measured current variation is above the reference value.

According to an embodiment, when the current variation information is received to the control device 300 only when the degree of the variation in current measured by the smart plug 150 is above the reference value, the control device 300 may detect that the home appliance 151 is turned on as the current variation information is received.

According to an embodiment of FIGS. 14A and 14B, the control device 300 may automatically detect the user's intention to use the home appliance by using the camera 210 and the sensor such as the motion detection sensor 220, which are provided in the HEMS 10 or by using the smart plug 150.

The description will be made again with reference to FIG. 12.

The control device 300 may calculate an energy state in the home to determine whether the home appliance that intends to be used by the user is suitable for use (S20).

The energy state may represent a state related to whether the home appliances in the home are capable of being driven by using the PV power generation amount, the remaining power amount of the battery of the ESS 130, and/or the remaining power amount of the battery of the EV 141 while minimizing the power supply from the power system 121. That is, the control device 300 may calculate the energy state to provide the calculated energy state to the user so as to minimize electricity charges in the home.

The control device 300 may calculate the energy state on the basis of the PV power generation amount and the energy consumption amount in the home. According to an embodiment, the control device 300 may calculate the energy state by additionally using the information on the remaining power amount of the battery of the ESS 130 and/or the remaining power amount of the battery of the EV 141. According to an embodiment, the control device 300 may calculate the energy state by additionally using the information on the average power consumption of the home appliance 151 to be used by the user.

An operation for calculating the energy state according to each of the foregoing embodiments will be described in more detail with respect to FIGS. 15A to 15C.

Figure 15A:
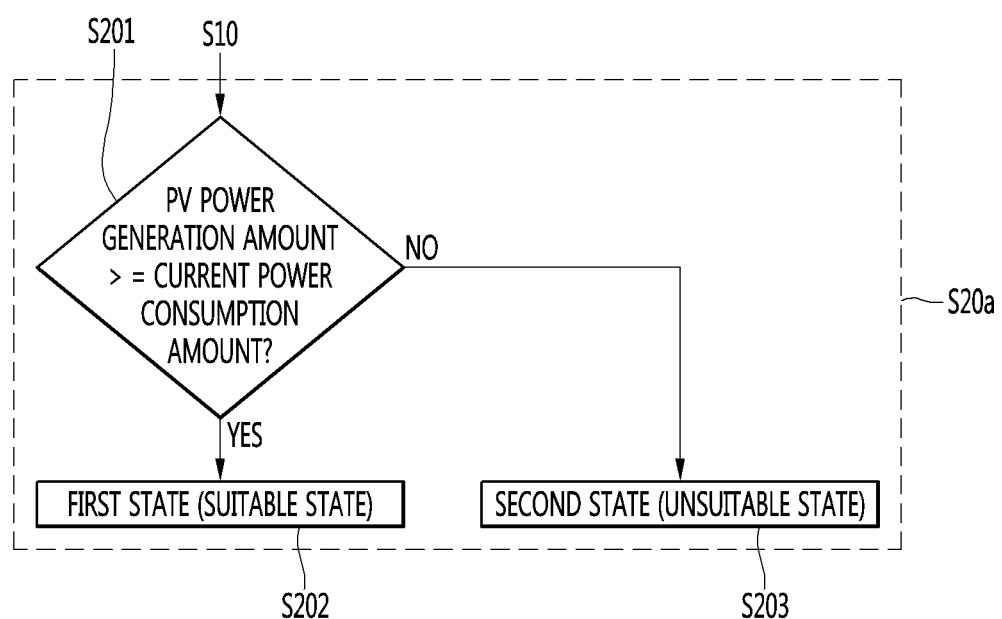
FIGS. 15*a* to 15*c* are flowcharts illustrating an example of an operation in which the control device calculates an energy state to determine whether the home appliance, which intends to be used, is detected, according to an embodiment, respectively.
Figure 15B:
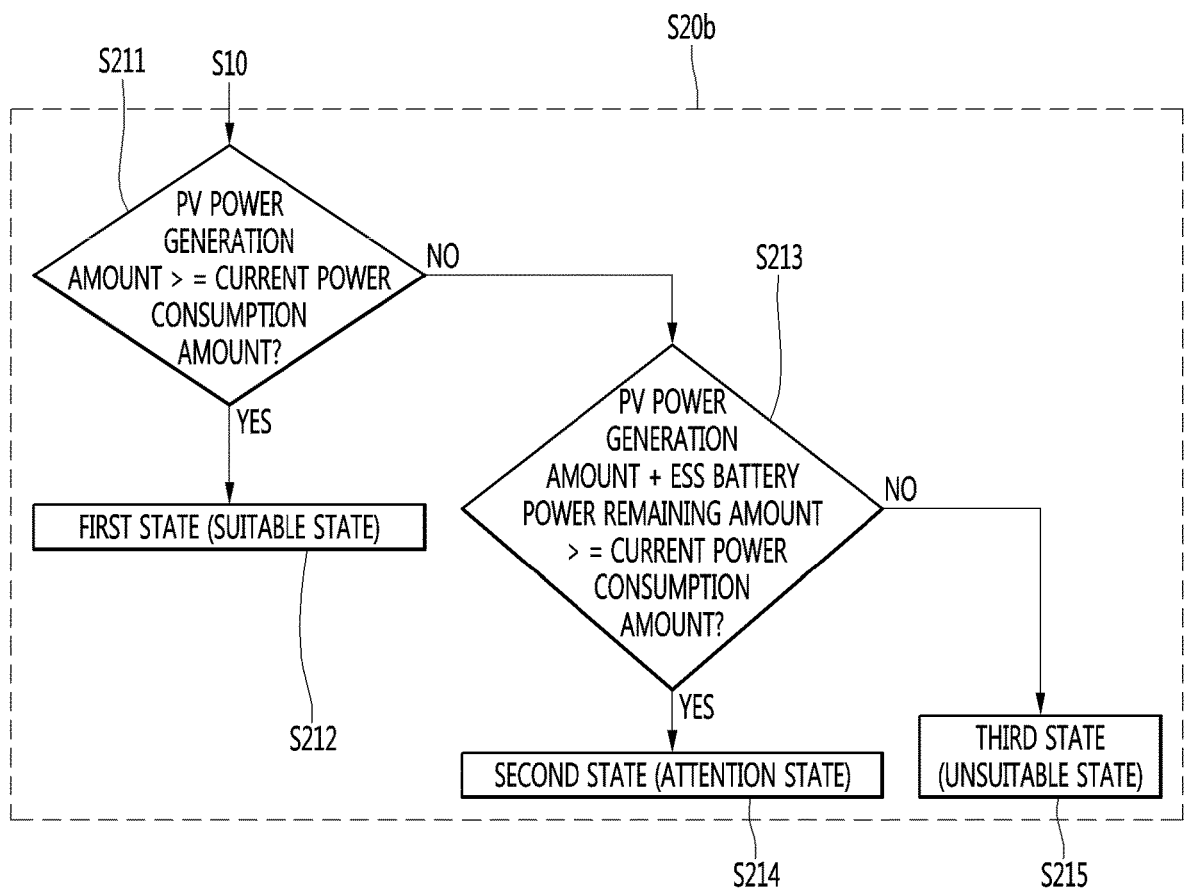
Figure 15C:
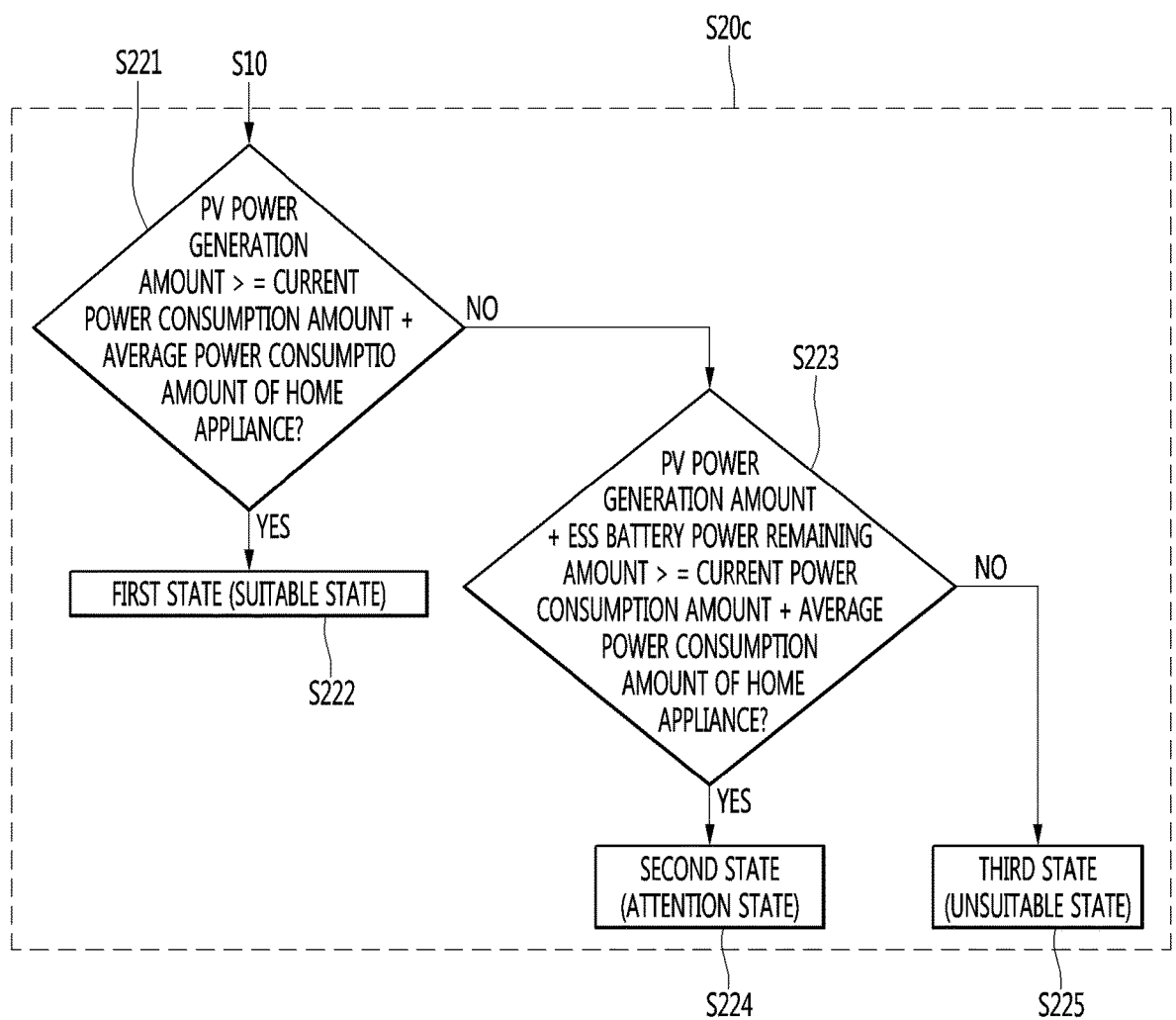

FIGS. 15a to 15c are flowcharts illustrating an example of an operation in which the control device calculates the energy state to determine whether the home appliance, which intends to be used, is detected, according to an embodiment, respectively.

Referring to FIGS. 15A to 15C, the PV power generation amount represents an amount of power generated by the PV module 111, and the current power consumption amount represents the total power consumption amount in the home. The remaining power amount of the battery of the ESS 130 may represent a remaining power amount of the battery 133 provided in the ESS 130, and the average power consumption amount of the home appliance may represent an average power consumption amount of the home appliance 151 to be used.

The control device 300 may receive the information on the PV power generation amount and the remaining power amount of the battery of the ESS 130 through the HEMS gateway 100. Also, the control device 300 may receive information on the power consumption amount of each of the home appliances 151 in the home through the HEMS gateway 100 to acquire information on the current power consumption amount by using the received information.

Referring to FIG. 15A, the control device 300 may compare the PV power generation amount with the current power consumption amount (S201). When the PV power generation amount is above the current power consumption amount (YES in operation S201), the control device 300 may determine that the energy state is a first state (a suitable state) (S202). Here, the first state (the suitable state) represents a state in which the home appliance 151 is suitable for use.

On the other hand, when the PV power generation amount is below the current power consumption amount (NO in operation S201), the control device 300 may determine that the energy state is a second state (an unsuitable state) (S203). Here, the second state (the unsuitable state) represents a state in which the home appliance 151 is unsuitable for use. That is, the second state may represent a state in which electricity charges occur when the user uses the home appliance 151.

Referring to FIG. 15B, the control device 300 may calculate the energy state in additional consideration of the remaining power amount of the battery of the ESS 130 in addition to the PV power generation amount and the current power consumption amount according to an embodiment.

The control device 300 may determine that the energy state is in the first state (the suitable state) when the PV power generation amount is above the current power consumption amount (YES in operation S211) (S212). The operation S212 may be substantially the same as the operation S202 of FIG. 15A.

On the other hand, when the PV power generation amount is below the current power consumption amount (NO in operation S211), the control device 300 may compare the sum of the PV power generation amount and the remaining power amount of the battery of the ESS 130 with the current power consumption amount.

When the sum of the PV power generation amount and the remaining power amount of the battery of the ESS 130 is above the current power consumption amount (YES in operation S213), the control device 300 may determine that the energy state is a second state (an attention state) (S214). Here, the second state (the attention state) represents a state in which the power of the battery of the ESS 130 is capable of being consumed when the home appliance 151 is used. That is, when the home appliance 151 is used for a long time, the power of the battery 133 may be completely consumed, and then, the power supplied from the power system 121 may be used.

When the sum of the PV power generation amount and the remaining power amount of the battery of the ESS 130 is below the current power consumption amount (NO in operation S213), the control device 300 may determine that the energy state is a third state (an unsuitable state). The third state (the unsuitable state) of FIG. 15B may be substantially the same as the second state of FIG. 15A.

According to an embodiment, the EV 141 may be connected to the EV charger 140. In this case, the control device 300 may calculate the energy state in additional consideration of the remaining power amount of the battery provided in the EV 141 in addition to the PV power generation amount and the remaining power amount of the battery of the ESS 130. That is, the control device 300 may determine that the energy state is in the second state (the attention state) when the sum of the PV power generation amount, the remaining power amount of the battery of the ESS 130, and the remaining power amount of the battery of the EV 141 is above the current power consumption amount.

Referring to FIG. 15C, the control device 300 may calculate the energy state in additional consideration of the average power consumption amount of the home appliance 151 to be used in addition to the PV power generation amount, the remaining power amount of the battery of the ESS 130, and the current power consumption amount.

As described with reference to FIGS. 13A and 13B, the control device 300 may acquire information on the average power consumption amount of the home appliance 151 to be used from the average power consumption amount of each of the home appliances, which is stored in the storage unit 320.

The control device 300 may determine that the energy state is in the first state (the suitable state) when the PV power generation amount is above sum of the average power consumption amount of the home appliance 151 to be used and the current power consumption amount (YES in operation S221) (S222). According to an embodiment of FIG. 15C, when the energy state is in the first state, since the PV power generation amount is above the total power consumption amount even though the home appliance 151 is used, the electricity charges may not occur.

On the other hand, when the PV power generation amount is below the sum of the current power consumption amount and the average power consumption amount of the home appliance 151 (NO in operation S221), the control device 300 may compare the sum of the PV power generation amount and the remaining power amount of the battery of the ESS 130 with the sum of the current power consumption amount and the average power consumption amount.

When the sum of the PV power generation amount and the remaining power amount of the battery of the ESS 130 is above the sum of the current power consumption amount and the average power consumption amount (YES in operation S223), the control device 300 may determine that the energy state is a second state (an attention state) (S224). Here, the second state (the attention state) represents a state in which the power of the battery of the ESS 130 is capable of being consumed when the home appliance 151 is used. That is, when the home appliance 151 is used for a long time, the power of the battery 133 may be completely consumed, and then, the power supplied from the power system 121 may be used.

When the sum of the PV power generation amount and the remaining power amount of the battery of the ESS 130 is below the sum of the current power consumption amount and the average power consumption amount (NO in the operation S213), the control device 300 may determine that the energy state is a third state (an unsuitable state).

As described with reference to FIG. 15b, the EV 141 may be connected to the EV charger 140. In this case, the control device 300 may calculate the energy state in additional consideration of the remaining power amount of the battery provided in the EV 141 in addition to the PV power generation amount and the remaining power amount of the battery of the ESS 130.

In FIGS. 15A to 15C, the energy state is divided into the 'suitable state' and the 'unsuitable state', or the 'suitable state', the 'attention state', and the 'unsuitable state'. However, the energy state may be more subdivided according to an embodiment.

The description will be made again with reference to FIG. 12.

The control device 300 may control illumination of the lighting device mapped with the home appliance on the basis of the calculated result of the energy state (S30).

The control device 300 may control illumination of the lighting device 230 mapped with the home appliance 151 to be used on the basis of the mapping data stored in the storage unit 320. Referring to FIGS. 13A and 13B, it is assumed that the home appliance to be used is a washer.

The control device 300 may calculate the energy state on the basis of one of the embodiments of FIGS. 15A to 15C when the washer, which intends to be used, is detected. The control device 300 may control illumination of the fourth lighting device LIGHT4 mapped with the washer on the basis of the calculated energy state.

For example, the control device 300 may control a color of the fourth lighting device LIGHT4. When the calculated energy state is in the 'suitable state', the control device 300 may transmit a first control signal for controlling the illumination color of the fourth lighting device LIGHT4 to a first color to the sensor control device 200. The sensor control device 200 may control the illumination color of the fourth lighting device LIGHT4 to the first color in response to the received first control signal. The first color may be a 'green' color, but is not limited thereto.

When the calculated energy state is in the 'attention state', the control device 300 may transmit a second control signal for controlling the illumination color of the fourth lighting device LIGHT4 to a second color to the sensor control device 200. The sensor control device 200 may control the illumination color of the fourth lighting device LIGHT4 to the second color in response to the received second control signal. The second color may be a 'yellow' color, but is not limited thereto.

Finally, when the calculated energy state is in the 'unsuitable state', the control device 300 may transmit a third control signal for controlling the illumination color of the fourth lighting device LIGHT4 to a third color to the sensor control device 200. The sensor control device 200 may control the illumination color of the fourth lighting device LIGHT4 to the third color in response to the received third control signal. The third color may be a 'red' color, but is not limited thereto.

That is, the control device 300 may visibly inform the calculated energy state to the user through the lighting device 230. Thus, the user may grasp the energy state on the basis of the color of the lighting device 230 when the user uses a specific home appliance. The user may determine whether to use the home appliance on the basis of the grasped energy state to efficiently utilize the power.

Although the control device 300 controls the color of the lighting device in operation S30, the present disclosure is not limited thereto. For example, the control device 300 may visibly inform the energy state to the user by controlling a degree of flickering or brightness of the lighting device.

Figure 16:
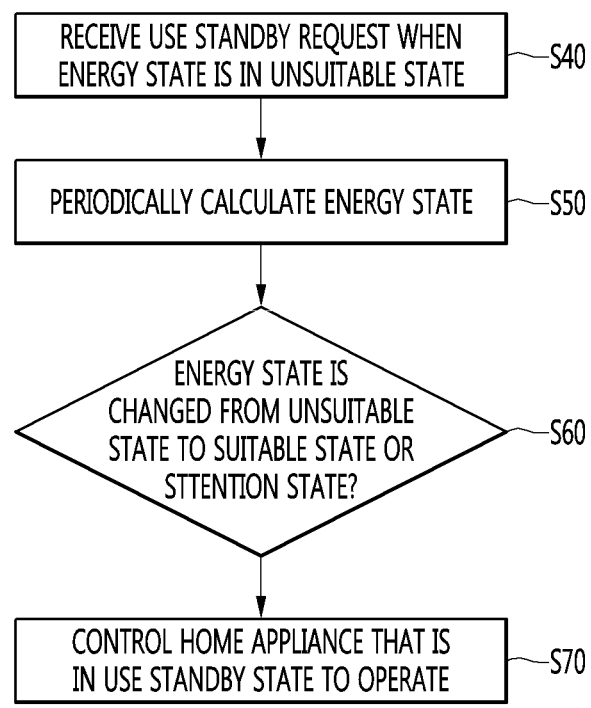
FIG. 16 is a flowchart illustrating an example of an operation in which the control device controls the HEMS when the calculated energy state is changed according to an embodiment.

FIG. 16 is a flowchart illustrating an example of an operation in which the control device controls the HEMS when the calculated energy state is changed according to an embodiment.

Referring to FIG. 16, when the energy state calculated according to the embodiment of FIGS. 15A to 15C is the 'unsuitable state', the control device 300 may receive use standby request with respect to the home appliance 151 that intends to be used (S40).

Particularly, when the calculated energy state is in 'unsuitable state', the user may input the use standby request with respect to the home appliance 151, which intends to be used, through the terminal 400 connected to the control device 300. The control device 300 may receive the inputted use standby request from the terminal 400.

According to an embodiment, when the user intends to use the plurality of home appliances, the user may input the use standby request with respect to each of the plurality of home appliances through the terminal 400. In this case, the control device 300 may receive a plurality of use standby requests from the terminal 400.

The control device 300 may periodically calculate the energy state in the home (S50). That is, the control device 300 may periodically perform the energy state calculation operation according to the embodiments of FIGS. 15A to 15C.

As the calculated results, when the energy state is changed from the 'unsuitable state' to the 'attention state' (S60), the control device 300 may control the home appliance 151 that is in the standby state to operate (S70).

Particularly, the control device 300 may periodically calculate the energy state in operation S50, and thus, the calculated energy state may be changed from the 'unsuitable state' to the 'attention state'. In this case, the control device 300 may transmit a control signal for operating the home appliance 151 that is in the standby state to the HEMS gateway 100 on the basis of the use standby request received in the operation S40.

The HEMS gateway 100 receiving the control signal may operate the home appliance 151 that is in the standby state. For example, the HEMS gateway 100 may transmit a power supply signal to the smart plug 150 connected to the home appliance 151. The smart plug 150 receiving the power supply signal may supply power to the home appliance 151 to allow the home appliance 151 to operate.

According to an embodiment, when the HEMS gateway 100 and the home appliances 151 are connected to each other, the HEMS gateway 100 may transmit an operation signal for operating the home appliance 151 to the home appliances 151. The home appliance 151 may operate in response to the received operation signal.

Also, when the control device 300 receives the plurality of use standby requests from the terminal 400, the control device may operate at least a portion of the home appliances on the basis of a priority order of each of the home appliances corresponding to the use standby requests. For example, the priority order may be set in an ascending order of the average power consumption amount, a descending order of the use frequency, an ascending order of the operation time, and the like, but is not limited thereto.

Although not shown, the energy state may be changed from the 'suitable state' or the 'attention state' to the 'unsuitable state'. In this case, the control device 300 may stop the operation of at least a portion of the home appliances on the basis of the priority order of each of the home appliances that are operating currently.

That is, according to the embodiment of FIG. 16, the control device may operate the home appliance that is in the use standby state or stop the operation of the home appliance that is operating on the basis of the change of the energy state to efficiently utilize the power.

According to an embodiment, the control device of the HEMS may automatically detect the home appliance to be used by the user and calculate the current energy state in the home to determine whether the detected home appliance operates by using only the power supplied from the PV module. The control device may visibly inform the determined result by using the lighting device in the home to allow the user to intuitionally confirm the current energy state in the home.

Also, since the user is capable of using the home appliance on the basis of the confirmed energy state, the electricity charges may be minimized while minimizing the use of the power supplied from the power system.

The above-described embodiments may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit of the control device. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

According to the embodiments, the control device may automatically detect the long-term absence situation or the long-term presence situation of the user so that the user efficiently use the power charged in the battery of the electric vehicle. Thus, the power chargers due to the power consumption in the home may be reduced.

According to the embodiments, the user efficiently set the battery power of the electric vehicle may be efficiently to the discharging mode through the message recommending the discharging mode.

According to the embodiments, the long-term absence situation or the long-term presence situation of the user may be more quickly detected.

According to the embodiments, the user may easily recognize that the electric vehicle is being efficiently used through the power saving cost provided to the terminal.

Also, according to the embodiments, the user may easily grasp what is mode in which the electric vehicle operates currently.

According to the embodiments, when the user uses a specific home appliance, whether the user operates the home appliance by using only the power supplied from the PV module may be intuitively informed.

According to the embodiments, the home appliances may operate by using only the power supplied from the PV module to efficiently use the power supplied from the PV module.

According to the embodiments, in the use of the home appliances, the use of the power supplied from the power system may be minimized to minimize the occurrence of the electricity charges paid by the user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control device for controlling a home energy management system (HEMS) including a home appliance, an electric vehicle (EV) and a gateway, the control device comprising:
   a communication unit configured to receive, from the gateway of the HEMS, energy management information including a photovoltaic (PV) power generation amount, a power consumption amount of the home appliance, a remaining power amount of a battery of the EV, and a minimum charging amount of the EV; and
   a control unit configured to control power of the battery of the EV so that the EV operates in one of a charging mode and a discharging mode on the basis of the energy management information,
   wherein the control unit is configured to:
      determine whether the PV power generation amount is greater than or less than the power consumption amount,
      determine whether the remaining power amount of the battery of the EV is less than or greater than the minimum charging amount of the EV,
      control the power of the battery of the EV so that the EV operates in the charging mode when the PV power generation amount is greater than the power consumption amount, and the remaining power amount of the battery of the EV is less than the minimum charging amount of the EV, and
      control the power of the battery of the EV so that the EV operates in the discharging mode when the PV power generation amount is less than the power consumption amount, and the remaining power amount of the battery of the EV is greater than the minimum charging amount of the EV.

2. The control device according to claim 1, wherein the HEMS further includes a PV module,
   wherein the charging mode is a mode for charging the battery of the EV by using power supplied from the PV module of the HEMS, and
   wherein the discharging mode is mode for supplying power charged in the battery of the EV to the home appliance.

3. The control device according to claim 1, wherein the HEMS further includes a terminal of a user,
   wherein the control unit is configured to receive the minimum charging amount of the EV from the terminal, and
   wherein the minimum charging amount is an amount that varies depending on a setting set by the user.

4. The control device according to claim 3, wherein the control unit is configured to transmit information indicating that the EV is in the charging mode to the terminal when the EV operates in the charging mode and to transmit information indicating that the EV is in the discharging mode to the terminal when the EV operates in the discharging mode.

5. The control device according to claim 1, wherein the control unit is configured to transmit to the gateway a charging control message or a discharging control message so that the EV operates in one of the charging mode and the discharging mode, respectively, on the basis of the energy management information.

6. The control device according to claim 1, wherein the control unit is configured to control an EV charger configured to manage the charging or the discharging of the EV so that the EV operates in one of the charging mode and the discharging mode.

7. A control device for controlling a home energy management system (HEMS) including a home appliance, an electric vehicle (EV) and a gateway, the control device comprising:
   a communication unit configured to receive, from the gateway of the HEMS, first energy management information including a photovoltaic (PV) power generation amount and a power consumption amount of the home appliance and to receive, from the gateway of the HEMS, second energy management information including a remaining power amount of a battery of the EV, and a minimum charging amount of the EV; and a control unit configured to control power of the battery of the EV so that the EV operates in one of a charging mode and a discharging mode on the basis of one of the first energy management information and the second energy management information, wherein the control unit is configured to:
  determine whether the PV power generation amount is greater than or less than the power consumption amount,
  determine whether the remaining power amount of the battery of the EV is less than or greater than the minimum charging amount of the EV,
  control the power of the battery of the EV so that the EV operates in the charging mode when the PV power generation amount is greater than the power consumption amount, and the remaining power amount of the battery of the EV is less than the minimum charging amount of the EV, and
  control the power of the battery of the EV so that the EV operates in the discharging mode when the PV power generation amount is less than the power consumption amount, and the remaining power amount of the battery of the EV is greater than the minimum charging amount of the EV.

8. The control device according to claim 7, wherein the HEMS further includes a PV module,
  wherein the charging mode is a mode for charging the battery of the EV by using power supplied from the PV module, and
  wherein the discharging mode is mode for supplying power charged in the battery of the EV to the home appliance.

9. The control device according to claim 7, wherein the HEMS further includes a terminal of the user,
  wherein the control unit is configured to receive the minimum charging amount of the EV from the terminal, and
  wherein the minimum charging amount is an amount that varies depending on a setting set by the user.

10. The control device according to claim 9, wherein the control unit is configured to transmit information indicating that the EV is in the charging mode to the terminal when the EV operates in the charging mode and to transmit information indicating that the EV is in the discharging mode to the terminal when the EV operates in the discharging mode.

11. A gateway of a home energy management system (HEMS) including an appliance, an electric vehicle (EV), and a control unit, the gateway comprising:
  a communication unit configured to receive energy management information comprising a photovoltaic (PV) power generation amount, a power consumption amount of the home appliance, a remaining power amount of a battery of the EV, and a minimum charging amount of the EV and to transmit the received energy management information to a control unit,
  wherein the control unit is configured to control power of the battery of the EV so that the EV operates in one of a charging mode and a discharging mode on the basis of the energy management information,
  wherein the control unit is configured to:
    determine whether the PV power generation amount is greater than or less than the power consumption amount,
    determine whether the remaining power amount of the battery of the EV is less than or greater than the minimum charging amount of the EV,
    control the power of the battery of the EV so that the EV operates in the charging mode when the PV power generation amount is greater than the power consumption amount, and the remaining power amount of the battery of the EV is less than the minimum charging amount of the EV, and
    control the power of the battery of the EV so that the EV operates in the discharging mode when the PV power generation amount is less than the power consumption amount, and the remaining power amount of the battery of the EV is greater than the minimum charging amount of the EV.

* * * * *